United States Patent [19]

Sanada et al.

[11] Patent Number: 4,893,148
[45] Date of Patent: Jan. 9, 1990

[54] METHOD FOR STORING DRY SILVER SALT ROLL FILM FOR ROTARY TYPE MICROPHOTOGRAPHY AND ROTARY TYPE MICROPHOTOGRAPHY CAMERA SYSTEM

[75] Inventors: Masahiko Sanada, Matsudo; Yoshio Hayashi, Fuji; Akira Ohruma, Fuji; Shuichiro Ogawa, Fuji, all of Japan

[73] Assignee: Asahi Kasei Kogyo Kabushiki Kaisha, Japan

[21] Appl. No.: 199,041
[22] PCT Filed: Jan. 31, 1987
[86] PCT No.: PCT/JP87/00066
§ 371 Date: May 3, 1988
§ 102(e) Date: May 3, 1988
[87] PCT Pub. No.: WO88/01758
PCT Pub. Date: Mar. 10, 1988

[30] Foreign Application Priority Data

Sep. 4, 1986 [JP] Japan .................................. 61-206739

[51] Int. Cl.⁴ ..................... G03B 27/32; G03B 27/52
[52] U.S. Cl. ...................................... 355/27; 355/100; 355/106; 430/203; 430/353
[58] Field of Search .................. 355/27, 28, 44, 45, 355/54, 72, 75, 104, 106, 100, 41, 99, 91, 70, 30, 132; 430/347, 353, 203, 358, 619

[56] References Cited

U.S. PATENT DOCUMENTS

| | | | |
|---|---|---|---|
| 3,585,917 | 6/1971 | Griffith | 430/358 |
| 3,764,329 | 10/1973 | Lee | 430/203 |
| 3,802,888 | 4/1974 | Willits | 430/203 |
| 3,816,132 | 6/1974 | Takegawa et al. | 430/353 |
| 4,035,074 | 7/1977 | Flor | 355/27 |
| 4,173,482 | 11/1979 | Akashi et al. | 430/619 |
| 4,227,799 | 10/1980 | Nonaka et al. | 355/27 |
| 4,376,816 | 3/1983 | Hayashi et al. | 430/347 |
| 4,653,890 | 3/1987 | Nordstrom et al. | 355/27 X |

Primary Examiner—Richard A. Wintercorn
Attorney, Agent, or Firm—Finnegan, Henderson, Farabow, Garrett & Dunner

[57] ABSTRACT

A dry silver salt roll film for use in the rotary type microphotography is stored in the form of a roll within a range of hardness from 70 of durometer A to 80 of durometer D, so that an unexposed film can be stored stably for a long period of time.

47 Claims, 17 Drawing Sheets

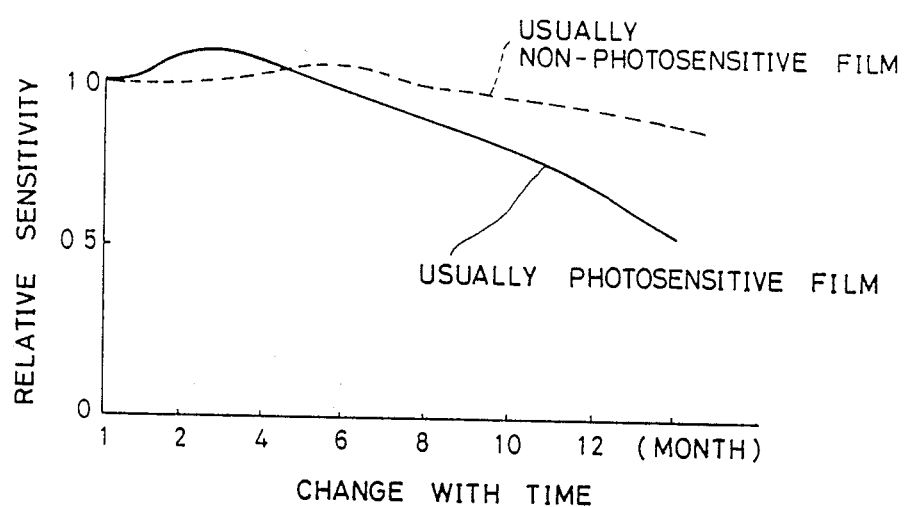
F I G. 1

METHOD FOR STORING DRY SILVER SALT ROLL FILM FOR ROTARY TYPE MICROPHOTOGRAPHY AND ROTARY TYPE MICROPHOTOGRAPHY CAMERA SYSTEM

TECHNICAL FIELD

The present invention relates to a method for storing a dry silver salt roll film for use in rotary type microphotography in which the roll film is used to obtain continuously exposed images by a high speed camera such as rotary type microphotography camera in such a way that advantages of the dry silver salt roll film are most utilized and also the present invention relates to a rotary type microphotography camera system for a film to be thermally developed.

BACKGROUND ART

Recently, the microphotographic recording of a large amount of documents such as checks, bank bills and so on by using rotary type microphotography cameras or the like have been frequently used in general offices such as banks. However, since wet silver salt films are used, it is necessary that the exchange of harmful processing liquid is carried out by general operators within such general offices. Therefore, there has been a strong demand for a system which can eliminate such harmful and complicated process and operations so that the development process can be accomplished in a simple manner.

Meanwhile, dry silver salt films which can be thermally developed to obtain images have been already developed as convenient silver salt film instead of wet silver salt film and used for various purposes. But, since stabilities of raw or unexposed film and developed images are limited, they have not been used in the rotary type microphotography cameras.

A conventional roll film heater comprises in general a rotating heating roller and a nip roller for ensuring the satisfactory intimate contact of the film with the heating roller so as to ensure the heating of the film. Alternatively, a conventional roll film heater comprises a heating roll and a wool yarn soft member adapted to make the film intimately contact with the heating roller. However, in such roll film heaters with the above-described constructions, the stability and quality of images obtained are greatly influenced by thermal developing conditions.

Some patents and reports disclose a process for making a film into very intimate contact with a heating roller by charging the film with static electricity and a method in which a film is caused to float in the air by the heated air so as to heat the film. (For example, see U.S. Pat. No. 3,585,917)

In general, in most conventional wet and rotary type cameras, a wet developing tank and a drying zone are disposed in the lower portion of the camera or an independent developing unit is used. As a result, the conventional rotary type cameras are large in volume and thus there is a problem that a considerably large installation space is required in the offices. In this manner, the conventional rotary type microphotography camera requires a relatively large developing space, contrary to a desire that the camera is designed to be compact in size. Therefore, it has been impossible to make the wet and rotary type camera considerably compact in size, unlike the rotary type camera using thermally developed films. Furthermore, in the case of a camera in which a wet developing tank, a water washing or rinsing tank and a drying zone are disposed in the lower portion of a camera, there has been a problem that a film loss is increased in the start and end portions of the film to be wound. In addition, the exposure and the development process are not carried out at the same speed, so that it is impossible to check a frame by carrying out developing processes simultaneously with the exposure.

The wet silver salt film does not include addition agents such as developing agent inside the film, so that the life of an unexposed wet silver salt film is longer than that of a dry silver salt film. Thus, in the conventional wet silver salt film rotary type camera, unexposed or raw films are stored only in a place shielded from light.

On the other hand, the storage stability of unexposed dry silver salt films is in general not satisfactory. Therefore, when the unexposed dry silver salt film is loaded in the rotary type camera of the type described above, the life of the unexposed film is one or two months at the longest due to the rise in temperature in the camera because a light source is incorporated adjacent to a rolled film and a thermal developing roller or the like is disposed adjacent to the film. As a result, the life of the film cannot be increased to a practically satisfactory period of time.

Furthermore, the wet silver salt film contains in general a reducing agent which reacts with a silver salt oxidizing agent when heated to precipitate metal salts, an adjusting agent for adjusting an amount of silver precipitated during the developing step, a binder acting as a bonding or dispersion agent for the silver-salt oxidizing agent, a thermal antifoggant, a chemical sensitizer, a stabilizing agent and so on which serve to adjust the photographic characteristics. However, during the storage, blooming of such addition agents tends to occur over the surfaces of the film and therefore limits the life of the unexposed film. Furthermore, the blooming deteriorates the picture quality such as resolution.

In view of the above, considerable efforts have been exerted in order to improve the stability of unexposed films and the stability of developed images by changing the compositions of the compounds of non-photosensitive dry silver salts, (for instance, as disclosed in Japanese Laid-Open patent application No. 53-114419 and its corresponding U.S. Pat. No. 4,173,482), but the improvement of the photosensitive materials has substantially reached the limit so that it is difficult to expect a further improvement of the film characteristics only by the improvements of the film compositions. For instance, when it is desired to increase a sensitivity, the stability of unexposed film is adversely affected. When it is tried to improve the stability, the sensitivity is decreased.

Therefore, the present inventors have extensively studied improvements of film from a broader viewpoint not only by improving the compositions of the photosensitive materials but also by changing the conditions under which the films are produced and by studying and introducing novel processes. As a result of such extensive studies and experiments, the inventors have found out various phenomena in the latter half of the film production process which cannot be observed in the conventional dry silver salt photosensitive materials.

For instance, even if various conditions of the production process after the coating of a non-photosensitive dry silver salt compound are slightly varied, the characteristics of the film vary over a considerably large range. Such processing conditions interact with each other in a very complicated way and affects the film characteristics, so that it is extremely difficult to define the ranges in which the conditions can be varied.

Moreover, the improvement of stability and quality of the film only by the improvement of the compositions of the photosensitive materials has now limit so that it is required to develop a camera system best adapted for use with dry silver salt film. That is, the camera system must be reviewed so as to improve its heating roller systems, optical systems and a film storage and rewinding system and furthermore there is the problem of how to monitor the storage conditions of unexposed film and how to control the film storage conditions.

DISCLOSURE OF THE INVENTION

In view of the above, an object of the present invention is to provide a method for storage of a dry silver salt roll film in such a way that the stability of an unexposed film stored in the rotary type camera, the stability of an image developed on the film and its image quality are remarkably improved.

Another object of the present invention is to provide a method for storing a dry silver salt roll film in such a way that the dry silver salt roll film exhibits its performance at its maximum.

A further object of the present invention is to provide a rotary type microphotography camera system for a dry silver salt roll film to be thermally developed, by which the dry silver salt roll film exhibits its performance at its maximum.

A still further object of the present invention is to provide a rotary type microphotography camera for a film to be thermally developed, which monitors the storage condition of the roll film.

A yet further object of the present invention is to provide a rotary type microphotography camera system for a film to be thermally developed, which stores the roll film under suitable conditions so as to extend the lifetime of the roll film.

A yet further object of the present invention is to provide a rotary type microphotography camera system for a roll film to be thermally developed, which attains a high exposure speed.

To the above and other ends, the inventors first noted a method for handling a dry silver salt roll film and made extensive studies and experiments for increasing the storage life of the dry silver salt film. As a result, when an unexposed film is rolled at a predetermined tightness of winding so that the roll film is stored in such a way that substantially no air layer exists between the adjacent rolled film layers, the addition agents of the types described above is prevented from blooming over the surface of the photosensitive layer of the roll film and it was found surprisingly that the storage life of the unexposed film can be remarkably increased. Thus, the present invention was made on the basis of the above recognition.

Furthermore, when use was made of a normally nonphotosensitive dry silver salt roll film which is not photosensitive at room temperature and under a normal light condition and which becomes photosensitive to an exposure light amount of 500 erg/cm$^2$ or less only when it is heated at a temperature of 60° C. or higher, it was found out that the storage lifetime of the unexposed film can be further extended so that further remarkable effects can be obtained by this type of film.

In addition, during the extensive studies and experiments conducted by the inventors for the purpose of developing films whose stability when not exposed is improved and which ensures the stability of the developed images, various conditions after the coating of a dry silver salt composition, such as a drying temperature, a drying method, a winding torque when the film is wound and the like are varied so as to determine the film characteristics. As a result of extensive experiments, the inventors found out that the lifetime of an unexposed film and the lifetime of a developed image can be remarkably increased only under very special conditions, Furthermore, other factors have been also extensively studied to complete the present invention.

More specifically, the inventors found out the following. That is, in the case that a base film having a predetermined optical density is used and a predetermined tension is applied by a predetermined shape (the film is wound in a rolled condition) and an amount of solvent contained in the composition is controlled to be within a predetermined range, it was found out that the stability of the dry silver salt film was remarkably improved.

Meanwhile, the inventors made extensive studies and experiments for the development of a rotary type camera by which the dry silver salt roll film can exhibit its maximum performance. As a result of this development, the camera system of the present invention was achieved.

More specifically, according to a first aspect of a camera system in accordance with the present invention, there is provided means for measuring an optical density of the film immediately after the thermal development thereof by a roll film heating system, so that the thermally developed image can be monitored substantially simultaneously with the thermal development and consequently the storage conditions of the unexposed film can be judged.

The above-described feature can be first easily realized only by a simple processing system utilizing thermal development. This judgement is important because the system proves that an image exposure was actually made in addition to the judgement of the quality of a developed image. Therefore, in the case of taking pictures of checks or the like, the system in accordance with the present invention offers great industrial advantages.

According to a second aspect of a camera system in accordance with the present invention, in a rotary type microphotography camera, a roll film heating system is not disposed below a raw film storage and unwinding system. The film heating system for thermal development is always incorporated in the microphotography camera system for a film to be thermally developed. Accordingly, in order to design and construct a compact camera system and to shorten a length of unused or loss film as short as possible, the unexposed film is stored at a position adjacent to the heating system. The relative position of the unexposed film storage and unwinding system in relation to the roll film heating system is extremely important. According to the present invention, the convection of air is taken into consideration when the relative positions of the heating system and the storage and unwinding system are determined, so that the unexposed film storage and unwinding system can be maintained in better conditions.

Here, it is preferably that a suitable shielding wall is interposed between the two systems for the purpose of thermal insulation.

Furthermore, it is practically advantageous to provide a safety circuit which monitors a temperature of the unexposed film storage and unwinding system so as to prevent a temperature of the film from being increased in excess of a set temperature. That is, in the case of a rotary type microphotography camera capable of high speed photography at a rate of 100-800 frames per minute, an exposure time during which photographs are taken consecutively is in general short, so that the provision of the shielding wall results in that a temperature rise rate of the unexposed film storage and unwinding system can be considerably decreased as compared with the exposure time.

Moreover, it was found out that when images are being checked by the optical density measuring means consecutively for a long period of time, erroneous operations occur in relation to the check of images. After various analysis of this fact, it was found out that the reliability of image check can be considerably improved by removing the vapor produced by sublimation by a filter.

A third aspect of a camera system in accordance with the present invention relates to an improvement of a roll film heating system. The present invention provides a rotary type microphotography camera system of the type heating an elongated roll like dry silver salt roll film, characterized by comprising a transfer means for transferring the roll film, a tension means for imparting a tension to the roll film so that a force resisting against the transfer of the roll film is produced, a cylindrical roll heater made of a thermally conductive material, a rotating means for rotating the roll heater, a holding means for holding the roll heater in such a way that the rotary tangential direction thereof coincides with the direction of the transfer of the roll film, a heating control means for heating the roll heater at a predetermined temperature. The tension means is disposed at the rear of the transfer means in the direction of the transfer of the roll film. The roll heater is so disposed between the transfer means and the tension means that the surface of the base of the roll film is wound around and brought into contact with the roll heater by a predetermined angle. The tension means is so adjusted that the tension applied to the roll film between the transfer means and the tension means is in the range of 5 g/mm$^2$-250 g/mm$^2$ per unit cross sectional area, whereby the roll film is made in contact with and heated by the roll heater.

According to the present invention, an amount of heat dissipated from the roll film heating system of the type described above can be minimized and it is ensured that a predetermined heating condition can be attained in a simple manner. As a result, the lifetime of an unexposed dry silver salt film can be remarkably increased.

A fourth aspect of a camera system in accordance with the present invention relates to an improvement of its optical system. That is, the illumination light is emitted in such a way that the illumination at the edges of an original is higher than that at the center portion thereof.

According to the present invention, the photosensitivity of a dry silver salt film which is lower than that of a wet silver salt film can be compensated and a high speed photography of a rotary type microphotography camera can be attained in a simple manner without deteriorating the quality of an image obtained by the rotary type microphotography camera and without remarkably damaging the safety of the original.

That is, in order to realize a high speed photography by a rotary type microphotography camera, the inventors departed from the general principle that in a rotary type microphotography camera, an original must be uniformly illuminated and on the contrary made extensive studies and experiments with respect to non-uniform illumination so that a method which can attain satisfactory results by non-uniform illumination was obtained. More specifically, when non-uniform illumination is employed intentionally, it may be considered to obtain a non-uniform illumination distribution so that an image density in one frame becomes uniform. However, the present invention is characterized in that non-uniform illumination is intentionally employed in order to attain a high speed photography.

According to a method for storage of a dry silver salt roll film for use in a rotary type microphotography in accordance with the present invention, the film is rolled at a tightness or hardness in the range from 70 in the durometer A hardness to 80 in the durometer D hardness.

In the present invention, a manner of winding a dry silver salt film into a roll is extremely important. That is, adjacent film layers of the film must be in contact with each other and the film must be rolled under a suitable tension condition. When the roll film is loosely rolled, there exists a portion of the rolled film in which the film layers are not completely in contact with each other. When the roll film is stored in the storage zone in the rotary type camera under such a loose tension condition, it is likely that bloom from the inside of the emulsion layer of the film appears at the boundary between the contact portion and the non-contact portion, so that the resolution at this boundary is degraded. On the other hand, when the film is rolled too tightly, fine bloom from the inside of the emulsion layer of the film blooms over the whole surface of the film, so that the surface condition is degraded. In contrast, when the film is rolled at a hardness in the range from 70 in the durometer A hardness to 80 in the durometer D hardness, it was found that the bloom from the emulsion layer on the roll film can be substantially eliminated and that the stability of an unexposed roll film can be remarkably improved.

While the winding hardness can be measured according to the testing method for a hardness of plastics by using a durometer as defined in JIS K7215, in the case of a roll film like in the present invention, the hardness can be expressed in terms of a numerical value, when the thickness of the roll is made equal to on thicker than 15 mm and when the hardness is measured at a point inwardly spaced apart from the surface of the roll by 5 mm or more.

It is preferable that the winding hardness is in the range from 80 in the durometer A hardness to 50 in the durometer D hardness. In this case, the lifetime of an unexposed roll film can be further extended. Furthermore, in order to further improve the stability of an unexposed roll film, it is most preferable that a polyester film having a thickness in the range of 25-125 micrometers is used as a base film and that the roll film is rolled at a hardness ranging from 20 to 40 in the durometer D hardness.

The storage method for a roll film in accordance with the present invention can be easily realized by winding the roll film at a stable torque when the roll film is manufactured.

Alternatively, the storage ability can also be further improved by interposing another sheet between the adjacent film layers of the roll film in such a way that both the contact portion and the non-contact portion do not coexist.

In the storage method in accordance with the present invention, the storage ability can be more enhanced by storing the roll film at a temperature in the range from 0° C. to 40° C.

When such a dry silver salt film is a normally non-photosensitive dry silver salt film, the storage temperature range can be broadened up to 55° C. Therefore, from a practical viewpoint, it is preferable to use a normally non-photosensitive dry silver salt film having an allowable temperature range which is wide.

Here, when the dry silver salt roll film is stored at a low temperature lower than 0° C., blooms appears on the surface of the film, as described above, so that its image quality is degraded. On the other hand, when the roll film is stored at a high temperature, there is a tendency that the storage lifetime of the film itself is considerably shortened.

A dry silver salt roll film, photosensitive or non-photosensitive, can have an extended lifetime by storing the film in a dark place in which an amount of light is 1 erg/sec cm$^2$ or less. However, this storage method is advantageous when the film is stored for a long period of time and no serious problem arises, even if the film is exposed in a bright place for a short period of time when handling the film.

Furthermore, according to the present invention, it is preferable that the film rolled in the manner described above is stored under such a condition that a volatile solvent in the dry silver salt film is in the range from 0.05 weight % to 3 weight % in relation to solids content of the compositions in the dry silver salt roll film.

Moreover, it is preferable that the dry silver salt roll film is stored in such a way that the unwinding tension is controlled to be in the range from 5 g/cm to 500 g/cm.

In addition, the dry silver salt roll film which is used in the present invention may be non-photosensitive. In this case, in order to ensure satisfactory storage, it is preferable that a non-photosensitive dry silver salt film comprises a base film of macromolecular film whose optical density is in the range from 0.5 to 1.0 and a non-photosensitive dry silver salt composition layer coated over the base film with a thickness in the range from 5 μm to 100 μm.

A material of the base film used in the present invention is not limited to a particular material as far as it is a flexible. For instance, polyethylene terephthalate, cellulose acetate, polycarbonate, polyvinyl chloride, triacetate fibers or the like is most popularly used. Furthermore, the thickness and the width of the base film are not limited to particular values and the base film having a thickness of 10–200 μm and a width of 10 mm–5 m or more preferably 16 mm–2 m is generally used.

An optical density of the base film used in the present invention is in the range from 0.05 to 1.0 and more preferably in the range from 0.1 to 0.3. When a base film with an optical density in excess of 1.0 is used, the base density becomes so high that an image becomes obscure and consequently this base film is not practical. On the contrary, in the case of a dry silver salt roll film having a base film whose optical density is less than 0.05, the stability of the unexposed film and an image can be improved in comparison to a conventional film.

Various methods for controlling the optical density to be in the range from 0.05 to 1.0 may be proposed. For instance, the surface of the film can be roughened or the base film may be colored.

In general, in order to color the base film, a method in which pigment is used as a coloring agent and is kneaded to pigment the base film in the step of blending compounds or a method of painting the surface of a film is generally employed. Various coloring agents can be used. For instance, typical coloring agents used for a base film of polyethylene terephthalate are listed below:

White: titanimum oxide, zinc white
Yellow: benzidine yellow, cadmium yellow, chrome yellow, titanium yellow, Hansa yellow, nickel-azo yellow
Orange: molybdate orange, chrome orange (chrome yellow R), benzidine orange, cadmium orange
Red: cadmium red, Watchung red, bordeaux, carmine FB, quinacridone red
Violet: cobalt violet, quinacridone violet
Green: phthalocyanine green, chrome green, chrome oxide green
Blue: ultramarine blue, cobalt blue, cyanine blue, ultramarine, iron blue
Black: carbon black, iron black
Silver: aluminum powder
Gold: bronze powder In addition, natural or synthetic pearl essence can be used.

The base film may be colored by any pigment and most preferably it is colored blue.

The above-described values of the optical density were obtained by the density measuring instrument having a tungsten halogen lamp as a light source, a latten #106 as a filter and a circular aperture having a diameter of 1 mm. These measured values of the diffusion transmission density coincide with those measured in accordance with USA ANSI standard PH2.19-1959.

The rotary type microphotography camera for use with a roll film to be thermally developed in accordance with the present invention is characterized by comprising a storage means for storing an unexposed roll film, an unwinding means for unwinding the unexposed roll film from the storage means, a light source for emitting light for illuminating an original to be exposed, an optical means for illuminating the original by the light emitted from the light source under the condition that the travel of the original is synchronized with the unwinding of the unexposed film and for imaging the output light from the original over the surface of the unexposed roll film at a reduced size, a heating means for heating the roll film thus exposed by the optical means to thermally develop the roll film, a monitor means for measuring, immediately after the thermal development, the optical density of the roll film thermally developed by the heating means to monitor the storage conditions of the unexposed film substantially simultaneously with the exposure and the thermal development and a discharging means for discharging the thermally developed roll film.

In the case of a normally non-photosensitive dry silver salt roll film, a heating means for heating to activate the unrolled film must be disposed in the prestage of the exposure or optical means.

The data which are specially desired to be detected by the monitor means is the degradation of an unexposed roll film due to the increase in fog density (minimum optical density) when the stored film is exposed to an external light or the degradation of the image density due to the decrease in photosensitivity. Therefore, in a specific embodiment of the monitor means, two reference values; that is, a set value of the minimum optical density of the thermally developed film and a set value of the maximum optical density corresponding to an image portion are set. The number of portions which exceed the set value of the maximum optical density are counted in terms of the frames and simultaneously it is confirmed whether or not there exists a portion having an optical density lower than the set value of the minimum optical density corresponding to the fog density. In this manner, the storage conditions of an unexposed roll film is monitored.

Furthermore, as a warning means for informing an operator or the like of deterioration of an unexposed roll film, there may be provided means for generating warning by means of sound and/or display when a count value of the frames does not coincide with the number of originals which have passed through the optical system of the rotary type microphotography camera system, and/or means for generating warning by means of sound and/or display when it is confirmed that a portion in which an optical density is lower than the set value of the minimum optical density corresponding to the fog density.

Here, taking an image quality of a microphotograhic image into consideration, the set value of the maximum optical density is determined in a range of 0.6–1.3, and the set value of the minimum optical density is determined in a range of 0.2–0.7. The set value of the minimum optical density serves to detect a storage condition of an unexposed film by confirming a condition for satisfactory storage of an unexposed roll film. Under the condition that an optical density does not exceed the maximum optical density.

In order to detect the image density, it is sufficient that at least one conventional photointerrupter is arranged in the travel passage of a thermally developed roll film, so that an optical density of an image is detected, corresponding to the transfer position of an original. In this case, the detection size can be about 0.1–0.5 mm in general.

In order to increase the life of an unexposed roll film in the rotary type microphotography camera system in accordance with the present invention, it is so constructed that the heating system for heating the unexposed roll film is not disposed below the system for storing and unrolling the unexposed roll film.

That is, the rotary type microphotography camera system in accordance with the present invention is characterized by comprising means for storing an unexposed roll film, means for unrolling the unexposed roll film from the storage means, a light source for emitting light for illuminating an original to be exposed, an optical means for imaging a reduced-size output light from the original which is illuminated by the light emitted from the light source on the surface of the unexposed roll film under the condition that the travel of the original is synchronized with the unrolling speed of the unexposed film, a heating means for heating the roll film exposed by the optical means to thermally develop the roll film, and means for discharging the thermally developed roll film, and the heating means being not disposed beneath the storage means.

Further, in the case of a normally non-photosensitive dry silver salt roll film, another heating means for heating to activate the unrolled roll film must be disposed in front of the exposure means.

In this positional relation, it is preferable to provide a partition wall for separating the heating means for the thermal development (in the case of a non-photosensitive dry silver salt roll film, the heating means for activating the film is included) and/or the optical means from the storage means.

Preferably, the partition wall has a slit required for unrolling an unexposed roll film from the storage means and is substantially in the form of a completely enclosed structure except the slit.

In addition, it is preferable that at least 90% or more of an area of the partition wall is made of an organic synthetic macromolecular material having a thermal conductivity of $3 \times 10^{-3}$ cal/sec/cm$^2$/°C./cm or less or a reinforced organic synthetic macromolecular material containing inorganic filler in addition to the organic synthetic macromolecular material and the partition wall has a thickness of at least 0.5 mm or more in average.

Especially, as far as an organic synethic macromolecular material is in the above-described thermal conductivity range, the material is not limited. Among such materials, it is preferable to use a macromolecular compound which can be used for injection molding and which has thermal resistance to some extent. Typical examples of such a resin are polycarbonate resin, ABS resin, denatured polyphenylene oxide resin (or "ZAIRON", the trade name of product by ASAHI KASEI KOGYO K.K. in Japan) and the like which are reinforced by glass fiber or the like.

Furthermore, in the structure with the partition wall of the type described above, in order to improve the storage life of an unexposed roll film, it is preferable that the storage means is maintained at a positive pressure of at least 0.1 mm H$_2$O or more relative to the pressure in the optical means during the operation of the camera.

In addition, it is preferable that an amount of light invading into the unexposed roll film storage means is limited to 5 lux or less at the most except the case that the film is loaded into or removed from the camera. For instance, the roll film storage means is provided with a duct through which the air for cooling the stored film is introduced into the storage means from the outside of the rotary type microphotography camera system for a thermally developed film, it is preferable that the storage means is so constructed that the light emitted from the light source or exterior light is not permitted to enter the storage means, whereby the above-described condition of limiting an invading light is satisfied.

Furthermore, as means for positively suppressing the temperature rise in the unexposed roll film storage means, there can be provided a safety unit which detects the temperature of the film storage means and interrupts the light source and/or an electric circuit for heating connected to the heating means when the detected temperature exceeds a predetermined temperature. In this case, the maximum predetermined temperature is, for instance, set at a temperature higher than room temperature by 5°–15° C.

In the present invention, when the means for measuring an optical density is used for a long period of time, there is the possibility that this measuring means is contaminated by sublimate or sublimated products produced during the thermal development, so that the reliability of the measuring means is adversely affected. In order to solve this problem, a circulating fan with a filter can be incorporated in the heating means, so that the contaminant such as sublimate is trapped by the filter to protect the measuring means, whereby the optical density can be measured with a high accuracy.

Futhermore, the rotary type microphotography camera system in accordance with the present invention of the type in which a dry silver salt roll film is heated comprises a travel means for travelling a roll film, a tension means for applying a tension to the roll film so as to produce a resisting force against the travelling of the roll film, a cylindrical roller heater made of a material having a high thermal conductivity, a rotating means for rotating the roller heater, a holding means for holding the roller heater in such a way that the rotating tangential direction of the roller heater is maintained in coincidence with the direction of the travel of the roll film, and a heating control means for heating the roller heater at a predetermined temperature, the tension means being disposed behind the film travel means in the direction of the travel of the roll film, the roller heater being interposed between the film travel means and the tension means in such a way that the surface of the base of the roll film is wound around and made into contact with the roller heater over a predetermined angle, and the tension means being so adjusted that the tension applied to the roll film between the film travel means and the tension means is 5-250 g/mm$^2$ per unit cross sectional area of the roll film, whereby the roll film is made into contact with the roller heater and is heated.

Here, according to the present invention, a cooling means may be arranged between the film travel means and the roller heater, so that the roll film which is heated at a temperature equal to or higher than a softening point of the material of the film can be cooled down below the softening point.

It is preferable that the speed ratio between the speed of the outer diameter of the roller heater in the rotating tangential direction and the travel speed of the roll film is selected to be within a range between 1 and 0.95, when the travel speed of the roll film is 1.

More specifically, in a roll film heater in which a dry silver salt photographic roll film is heated continuously at a temperature not less than a softening point of the material of the roll film (Gauss transition temperature) for a predetermined period of time, a roll film heater in accordance with the present invention comprises a travel means for travelling a dry silver salt photographic roll film, a tension means for applying a resisting force against the travel of the roll film so that the roll film can be intension, a cylindrical roll heater made of a material having a high thermal conductivity, a rotating means for rotating the roll heater, a holding means for holding the roll heater in such a way that the rotating tangential direction of the roll heater is maintained in coincidence with the direction of the travel of the roll film, and a heating control means for heating the roll heater at a predetermined temperature, the tension means being disposed behind the film travel means in the direction of the travel of the roll film, the roll heater being interposed between the film travel means and the tension means in such a way that the surface of the base (non-coated surface) of the roll film is wound around and made into contact with the roll heater over a predetermined angle, and the tension means being so adjusted that the tension applied to the roll film between the film travel means and the tension means is 5-250 g/mm$^2$ per unit cross sectional area of the roll film, whereby the roll film is made into contact with the roll heater and is heated.

Furthermore, the present invention is characterized by comprising means for storing an unexposed roll film, means for unrolling the unexposed roll film from the film storage means, a light source for emitting light for illuminating an original to be exposed, an optical means for imaging a reduced-size output light from the original which is illuminated by the light emitted from the light source on the surface of the unexposed roll film under the condition that the travel of the original is synchronized with the unrolling speed of the unexposed film, a heating means for heating the roll film exposed by the optical means to thermally develop the roll film, and means for discharging the thermally developed roll film, and the light source emits the illuminating light in such a way that a portion which is spaced apart from the portion where the optical axis of the optical means is substantially perpendicular to the original and which is exposed simultaneously with the other portion is illuminated at an illumination higher than that illuminating the portion where the optical axis of the optical means is substantially perpendicular to the original.

Further, in the case of a normally non-photosensitive dry silver salt roll film, it is required that another heating means for heating to activate the unrolled roll film be disposed in front of the exposure means.

More specifically, according to the present invention, in the rotary type microphotography camera system where a reduced-zise exposure is carried out while the original and the photographic film are travelled in synchronism with each other, the light source emits the illumination light in such a way that the illumination on the peripheral portion (to be referred to as "original peripheral portion") which is spaced apart from the center portion (to be referred to as "original central portion") where the optical axis of the photographic lens of the optical means is substantially perpendicular to the original and which is exposed simultaneously, is higher than the illumination on the original center portion.

When an angle formed between the line connecting the original peripheral portion with the center of the photographic lens and the optical axis defines an incident angle, it is preferable that the light source illuminates the original in such a way that the illumination on the original peripheral portion is not lower than at least the reciprocal number of the fourth power of the cosine of the incident angle relative to the illumination on the original center portion.

More preferably, a substantially rectangular slit is provided between the original and the photographic lens or between the photographic lens and the photographic film.

The effect and advantage of the use of the illumination light source which produces such an illumination distribution that the illumination on the original peripheral portion spaced apart from the original center portion is higher than the illumination on the original center portion will be described.

As described above, in the rotary type microphotography camera, due to an image quality and the limit of the exposure time, the exposure speed is mainly limited in the original peripheral portion, while it has a sufficient margin in other portion of the original. The present invention is based upon this fact. Furthermore, in view of a general shape of the rotary type microphotography camera, it is easy to dissipate the heat locally developed in the original peripheral portion by the illumination at a high illumination. That is, in the rotary type microphotography camera, a portion in which the resolution is worst is the peripheral portion of the photographic lens which has a large distortion and a shallow depth of field, and a portion of the photographic film where the illumination is low is also the peripheral portion.

In order to obtain a uniform image density in one frame, a portion which must be exposed for a long period of time is the same peripheral portion, that is, the portion corresponding to the light passing through the widest portion of a sector shaped slit. It follows, therefore, that when this portion is illuminated at a high illumination and the slit width in the center portion is made almost close to the slit width in the peripheral portion, the high speed photography can be attained in a simple manner. In other words, an amount of light in the original peripheral portion is increased, while an exposure time is increased in the original center portion, so an amount of light energy exposing the photographic film is increased, and consequently, the exposure speed can be increased.

Furthermore, the performances of the photographic lens relating to image quality are better in the original center portion than in the original peripheral portion, so that even if the width of the slit opening corresponding to the central portion is made wider as compared with the slit width corresponding to the original peripheral portion, the center portion has a width with which the image quality in the center portion is not degraded as compared with the image quality in the peripheral portion. Therefore, when the illumination matched with the reversed-sector shaped slit is made; that is, when the illumination on the original peripheral portion is equal to or higher than the reciprocal number of the fourth power of the cosine of the incident angle relative to the illumination on the original center portion, the photographic speed can be further increased.

It is preferable that the slit is in the form of rectangle, because it can be formed by a simple working with a machine tool and consequently with an inexpensive cost.

In the case of using a photographic lens causing no shading, if the illumination is so controlled that the illumination on the original peripheral portion has a value obtained by dividing the illumination on the original center portion by the fourth power of the cosine of the incident angle, a uniform density can be obtained in one frame when the slit is substantially in the form of rectangular opening.

When the illumination on the original peripheral portion is a value obtained by dividing the illumination on the original center portion by the fourth power of the cosine of the incident angle, the illumination over the reduced-size imaging surface becomes uniform. When the slit in the form of rectangular opening is used, an exposure time for respective portions of the original becomes constant.

The reason why the ratio between the illumination on the original center portion and the illumination on the original peripheral portion is made equal to the fourth power of the cosine of the incident angle is that the above-described decrease in solid angle and the Lambert's law are applied both to the original side and the roll film side.

Furthermore, in view of the structure of the rotary type microphotography camera, the increase in heat amount due to the illumination on the original peripheral portion at a high illumination results from the lamps of the light source disposed as positions corresponding to the original peripheral portion. Accordingly, the heat generated by the lamps disposed at such positions can be easily dissipated. As a result, the light source in which the lamps are arranged in the manner described above can be employed to increase, the exposure speed in a simple manner.

Especially in the case of a duplex type and rotary type microphotography camera, the increase in generated heat when the original peripheral portion is illuminated at a high intensity, is concentrated only on one side of the edge portions of the original due to the structure of the camera, so that it is sufficient to provide only one exhaust fan on the side of that edge of the original. In this way, the camera can be made simple.

In the exposure step, the dry silver salt roll film and the original to be exposed travel through the lens system at a predetermined speed ratio depending on rate of a size reduction in synchronism with each other, so that it is so controlled that the original seems to be stationary when viewed from the roll film, During this travel, the information of the original is exposed through the slit on the roll film.

In this exposure step, it is important to control the temperature of the roll film in order to obtain a high quality image. It is preferable that the roll film is maintained at a temperature between 15°–55° C., so that the photographed image has a predetermined sensitivity, a predetermined gradation and a predetermined resolution. In the exposure step, a more preferable temperature range is between 20°–45° C. and the roll film which is exposed within the temperature range as described above can be very satisfactorily developed.

An adjusted temperature in the exposure step always refers to a temperature when the roll film itself is to be exposed. Accordingly, this temperature adjustment must be taken into consideration as an important exposure factor when the film is unrolled by the unrolling means from the film storage means and is travelled to the optical exposure means at the next stage, while the film is maintained at a high temperature. When the temperature of the film is relatively low, the above-described circulation fan with a filter, for instance, as means for performing rapid temperature control, can remove the sublimated compounds and also the temperature rise effect can be substantially expected by the warm air. On the other hand, when the temperature of the film is high, it is possible to cool the film by making the film into contact with a cooling roller.

According to the present invention, the exposed roll film is continuously travelled to the heating means so for the subsequent process of thermal development. In the heating means, the roll film is heated at a temperature between 100°–150° C. and is thermally developed.

The temperature in the thermal developing step varies depending upon a type of the dry silver salt roll film and it is preferable that the thermal development is accomplished at a temperature between 110°–140° C. during 0.1–10 seconds. By evaluating the photographic characteristics of the roll film, the optimum conditions for the developing temperature should be determined, so that the developing temperature is maintained at a fixed level as practically as possible. When the developing temperature is lower than the optimum value, the image density becomes low, even though the film is sufficiently exposed. On the other hand, when the developing temperature is higher than the optimum temperature, photographic fog is produced.

As this heating system, use can be made of conventional heating means such as a heating roller, a heating plate, heated air, infrared heating and so on. However, in order to facilitate the above-described temperature control, it is most preferable to use the above-described heating roller. Each of three zones; that is, the roll film storage zone, the exposure zone and the thermal development zone has an optimum temperature range as described above. When the roll film is processed within the optimum temperature range in each zone, it was realized that an extremely high quality image was stably obtained.

The dry silver salt roll film used in the present invention generally contains silver salt of long chain fatty acid, and further contains a reducing agent for silver salt such as hindered phenol, a toning agent for obtaining a black image and a binder as essential compositions. In addition, an emulsion containing other additives is coated over a base film such as polyester film, acetate film or the like.

Of the dry silver salt roll films, especially as normally non-photosensitive dry silver salt roll films of the type which is non-photosensitive under normal light and exhibits a practical exposure speed; that is, a sensitivity corresponding to an amount of exposure light of 500 erg/cm$^2$ or less only when they are heated at a temperature in excess of 60° C., there are films which can be obtained by special combinations of the above-described dry silver salt roll films or by suitably selecting additives. Typical examples are disclosed in Japanese patent application Laying-open No. 48-97523 (corresponding to U.S. Pat. No. 3,816,132), Japanese patent application Publication No. 53-2687 (corresponding to U.S. Pat. No. 3,764,329), Japanese patent application Publication No. 53-41967, Japanese patent application Laying-open No. 48-51626 (corresponding to U.S. Pat. No. 3,802,888), Japanese patent application Laying-open No. 53-114419 (corresponding to U.S. Pat. No. 4,173,482) and so on.

As organic silver salt oxidizing agents, it is especially advantageous to use silver salt of long chain fatty acid, for instance, silver salt of stearic acid, silver salt of behenic acid or the like.

Binders are, for instance, polyvinyl butylar, polyvinyl formal, polymethyl methacrylate, cellulose acetate, cellulose butylate, polystyrene, vinyl chloride, vinyl acetate copolymer and so on.

Reducing agents are, for example, hydroquinone, hindered phenol in which ortho (o) or para position of hydroxyl group is replaced, for example, 2,6-di-t-butyl-4-methyl phenol, 2,2'-methylene-bis-(4-methyl-6-butyl phenol), 2,2'-methylene-bis-(4-ethyl-6-t-bultyl phenol), 2,4,4-trimethyl phenyl bis-(2-hydroxy-3,5-dimethyl phenyl)methane, 2,5-di-t-butyl-4-methoxy phenol and so on.

Toning agents are, for instance, phthalic derivative such as phthalazinone, N-bromophthalazinone and the like. Volatile solvents which are made to remain in the present invention are toluene, methyl ethyl ketone, acetone, methanol, ethanol, isopropanol, hexane, dioxane, tetrahydrofuran and so on.

The volatile solvents used in the present invention are not specially limited as far as their boiling points are not higher than 150° C. They are selected from alcohol series solvents such as methanol, ethanol, propanol, butanol, cyclohexanol, methylcylohexanol, aromatic series solvents such as toluene, xylene, styrene, keton series solvents such as methyl ethyl ketone, acetone, isobutyl methyl ketone, cyclohexanone, ester series solvents such as ethyl acetate, butyl acetate, isobutyl acetate, isopropyl acetate, ether series solvents such as diethyl ether, dimethyl ether, dioxane, ethylene glycol monoethyl ether, and various other organic solvent. It is preferable to use a weak base, weak acid or neutral solvent.

The non-photosensitive dry silver salt compositions used in the present invention include at least one compound selected from the group consisting of halogen moleculars, N-haloamide and organic acid in addition to organic silver salt oxidizer, high molecular compounds, a reducing agent, a toning agent and a volatile solvent.

In the case of coating a dry silver salt composition over a support or base, first, a volatile solvent is added to the dry silver salt compound so as to obtain a composition solution having a viscosity suitable for the coating. In this case, the volatile solvent used may be the same solvent as that contained in the dry silver salt composition or may be different from it.

The process of coating the dry silver salt composition diluted by the solvent on the base can be carried out by handwork such as brushing, but from the standpoint of productivity and efficiency, it is preferable to use a continuous coater such as a reverse roll coater, a curtain coater, a gravure coater, a doctor coater, a bar coater, a double-side coater or the like. When the continuous coater is used, it is general to select the coating speed in the range of 0.5-2000 m per minute and more preferably in the range of 5-500 m per minute. In this case, the coating thickness is selected within a range 5-100 μm.

The coating may be a single layer containing all the compositions. Alternatively, the coating may be two or more layers including a first layer mainly containing an organic silver salt oxidizing agent and a second layer mainly containing a reducing agent and other additive agents. In the latter case, and when the continuous coating process is used, after the formation of the first layer and prior to the succeeding drying process, the second layer, the third layer and so on can be continuously coated over the first layer. Alternatively, each layer can be subjected to the drying process every time that each layer is coated. A method for manufacturing a non-photosensitive dry silver salt film is disclosed, for instance, in Japanese patent application Publication No. 59-2895.

Next, the drying step will be described. Since the non-photosensitive dry silver salt composition cannot be dried at a high temperature, and accordingly it must be dried at a temperature lower than 65° C. In one example of the drying step, the composition is forcibly dried by blowing a gas. The gas used is in general air, but any gas which does not react with the silver salt composition can be used.

In the manner described above, an amount of the volatile solvent in the dry silver salt composition is adjusted to be within a range from 0.05 weight % to 3 weight % per the weight of the solid composition. When the amount of the volatile solvent exceeds the above-described range, the stability of an unexposed roll film and developed image cannot be maintained satisfactorily, though the reason is not clear.

In general, the roll film is dried under the condition that the photosensitive material was coated over the surface of the base, but after 90 weight % by of the volatile solvent has been volatilized, the film may be dried in the form of a rolled film, so that the final amount of the volatile solvent is controlled to be within the range between 0.05 weight % and 3 weight %. This remaining amount of the volatile solvent can be generally quantitatively measured by using gas chromatography.

As a method for rolling the film, there is the following method, for example, which is used in general. That is, a length of a non-photosensitive dry silver salt film formed by drying is slitted into a required width of, for instance, 16,35 or 105 mm by a slitter and then is wound around a suitable reel.

The film is rolled at a roll tension in a range from 5 g/cm to 500 g/cm. Preferably, the rolling tension is not lower 10 g/cm and not higher than 50 g/cm. If the rolling tension is too strong, damages to the film or, blocking when the film is wound and the separation of the photosensitive material or layer when the film is unrolled as well as bleeding (that is, a phenomenon that the coated composition bleeds over the surface) tend to occur frequently. On the other hand, when the rolling tension is too weak, the rolled condition is unstable, so that the roll film tends to be easily damaged. Furthermore the winding strength becomes non-uniform, so that the stability of the unexposed roll film becomes non-uniform, which is not satisfactorily practical. The unrolling tension applied to the tape when it is unrolled is selected to be equal to the rolling tension or a tension lower than the rolling tension. It follows, therefore, that the unrolling tension of the roll film is not lower 5 g/cm and not higher than 500 g/cm and more preferably within a range from 10 g/cm to 50 g/cm. When the unrolling tension is too strong, only the outer portion of the roll film is wound tightly, so that the unrolled film is deformed and damaged. On the other hand, when the unrolling tension is weak ended, the tension of the roll film is gradually decreased, resulting in the loose roll of the roll film.

As to a method of measuring the tension applied to the roll film, various conventional methods may be employed. One of the simplest method is to measure the weight of a weight which is suspended from the leading edge of the roll film when the weight is in balance with the roll tension.

There are various methods for winding the roll film. A typical method is the dancer roll method or a winding torque control system in which the roll film is wound while the tension is adjusted by using a sensor.

BRIEF DESCRIPTION OF THE DRAWINGS

FIG. 1 is a characteristic chart showing the measurement results of the ageing of the dry silver salt film stability carried out in the second embodiment of the present invention;

BEST MODES FOR CARRYING OUT THE INVENTION

Figure 2:
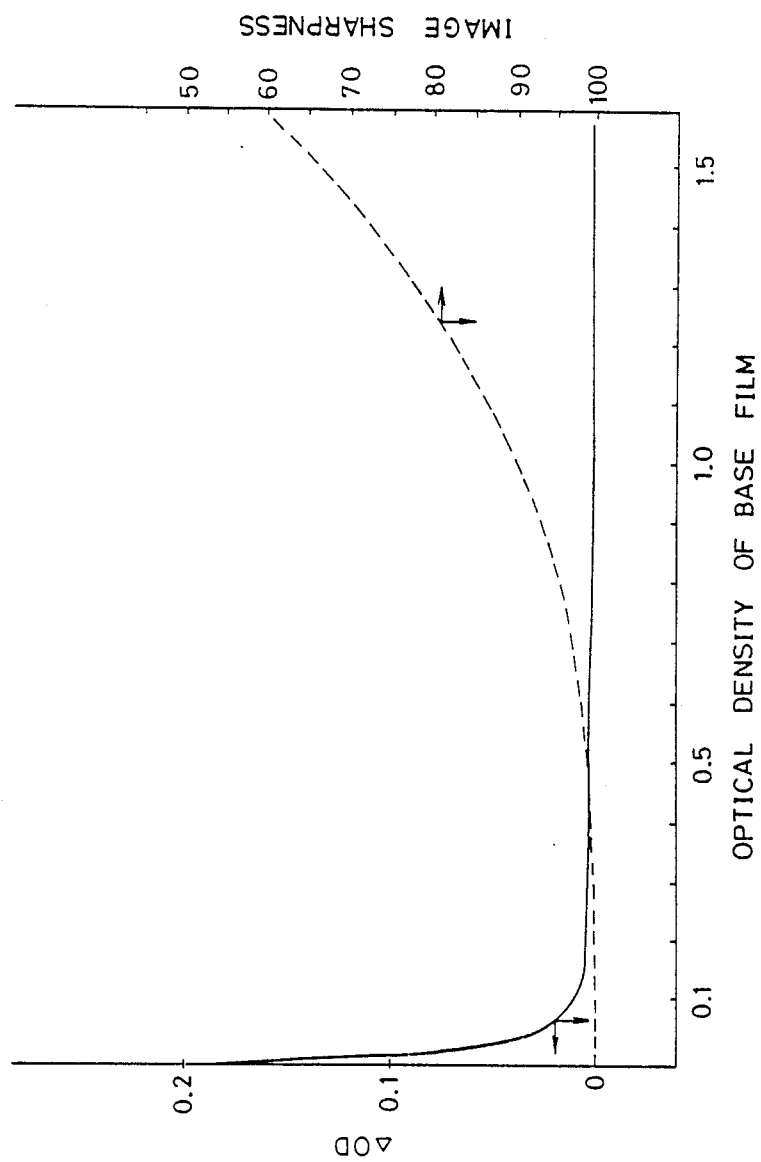
FIG. 2 is a graph illustrating the variation in density difference (solid line curve) due to for with respect to the optical density of the film base and the variation (broken line curve) in sharpness of the developed image.

Now, embodiments of the present invention will be described in more detail, but it is to be understood that they are mere embodiments of the present invention and do not limit the present invention.

EMBODIMENT 1

The dry silver salt film having the following compositions was prepared in a dark place and the film having a width of 16 mm (30.5 m in length) was wound around a reel:

| (1) | Base film: 75 μm in thickness (polyester film) | |
|---|---|---|
| (2) | The first layer (weight per $m^2$): | |
| | silver behenate | 4 g |
| | polyvinyl butylar | 4 g |
| | silver iodo bromide* | 0.5 g |
| | 1-benzyl-2-pyrrolydinone | 0.2 g |
| | sensitizing coloring matter** | 0.005 g |
| (3) | The second layer (weight per $m^2$): | |
| | polyvinyl acetate-polyvinyl chloride copolymer | 2 g |
| | hindered phenol developing agent*** | 1 g |

-continued

| | |
|---|---|
| phthalazone | 0.33 g |

*calculated from the charging ratio when it is assumed that 100% of a halogen ion source reacted.
**1-carboxylmethyl-3(n-methylbenzothiazolylindyl)-4-thia-2-thiohydantoin
***1,1-bis(2-hydroxy-3,5-dimethyl phenyl-3,5,5-trimethyl hexane Various samples of the roll film whose winding hardness was varied as shown in TABLE 1 were prepared and left for three months at 30° C. and at 60% RH so as to investigate its change with time.

TABLE 1

| Experiment No. | Winding Hardness | Sensi-tivity* | Contact Resolution lines/mm | Outer Appearance |
|---|---|---|---|---|
| 1 Embodiment | 80 in durometer A | 0.87 | >360 | Good |
| 2 Embodiment | 38 in durometer D | 1.01 | >360 | Good |
| 3 Embodiment | 73 in durometer D | 1.06 | >360 | Good |
| 4 Embodiment | 30 in durometer D (95 in durometer A) | 0.09 | >360 | Good |
| 5 Comparative Example | 60 in durometer A | 0.41 | | Crystals were precipitated around air bubbles. |
| 6 Comparative Example | 84 in durometer D | 0.53 | | Fine crystals were precipitated over the whole surface. |

*The sensitivity was expressed in terms of a reciprocal number of an amount of exposure light required for obtaining OD = 1 and was shown as a relative value when the initial sensitivity was 1.

EMBODIMENT 2

The film used in the first embodiment of the present invention and the film disclosed in the first embodiment of Japanese patent application Publication No. 58-16170 as the the normally non-photosensitive dry silver salt film were used. Under the same conditions as the first embodiment, the charge in stability with time was examined for about one year and the results are shown in FIG. 1.

Further, both the films were rolled in such a way that the rolled hardness became 35 in Durometer D.

EMBODIMENT 3

A usual rotary type camera available on the market was modified. That is, in order to vary the unrolling torque, a nip roller for unrolling the film was mounted and the band brake was effected on the roll film so that winding tests could be conducted at various winding hardness.

The film used in the third embodiment was the same as that used in the first embodiment and the practical tests in which 500 frames were continuously exposed per one day were conducted for one month. The test results are shown in TABLE 2 below:

TABLE 2

| Experiment No. | Rolled Hardness | Sen-sitivity | Outer Appearance | Handling Capability |
|---|---|---|---|---|
| 1 Embodiment | durometer D 36 | 1.0 | Good | Good |
| 2 Embodiment | durometer D 65 | 0.95 | Good | Relatively good, but scratches were made by the nip roller |
| 3 Embodiment | durometer A 92 | 0.88 | Good | Relatively good, but shallow winding distortions occurred partially |
| 4 Comparison | durometer D 85 | 0.55 | (a) | (b) |
| 5 Comparison | durometer A 63 | 0.53 | (c) | (d) |

(a) Fine crystals were precipitated over the whole surface.
(b) Unsatisfactory. Deep scratches were made by the nip roll so that the image forming layers were considerably damaged.
(c) Crystals were precipitated around air bubbles.
(d) Unsatisfactory. Large winding distortions occurred. The film was partly separated from the portion where the crystals were precipitated.

EMBODIMENT 4

Under the condition that the tension of the roll film used in experiment No. 2 in the first embodiment was controlled as shown in TABLE 3 below, the film was left for two weeks at 30° C. and at 60% RH in the apparatus obtained by modifying the rotary type cameras which was available on the market.

TABLE 3

| Experiment Nos. | Tension g/cm | Outer Appearance | Handling Capability |
|---|---|---|---|
| 1 Embodixent | 80 | Good | Good |
| 2 Embodiment | 5 | Good | Good |
| 3 Comparative Example | 1 | Scratches occurred | The film roll became loose while the film was travelling, so that the film meandered while travelling. |
| 4 Comparative Example | 750 | The surface layer portion of the film was tightly rolled, resulting in deformation. | Due to the deformation of the film, the synchronization could not be attained when the film was travelled. |

EMBODIMENT 5

About 10 liter of a non-photosensitive dry silver salt composition solution having the following compositions was prepared:

| | |
|---|---|
| silver behenate | 2 g |
| polyvinyl butylar resin | 1.6 g |
| barium iodide | 90 mg |
| phthalazinone | 0.4 mg |
| 2,2'-methylene-bis-(4-ethyl-6-tert-butyl phenol | 1.5 g |
| quinoline | 0.8 g |
| N—methyl pyrrolidone | 1 g |
| methyl ethyl ketone | 25 g |
| toluene | 9 g |
| mercury acetate | 4 mg |

-continued

| | |
|---|---|
| methanol | 3 g |

These compositions were mixed in a dark room by sufficiently stirring them for about two hours at 22° C. and maintained at 22° C. as a coating solution. Next, this coating solution was coated as the first layer over a polyethylene terephthlate film having a thickness of about 100 μm by a reverse roller coater in such a way that the first layer became about 9 μm in thickness after drying.

Thereafter, the second layer liquid having the following composition was uniformly coated in such a way that the second layer became about 7 μm in thickness after drying and then the film was rolled after it was dried.

| | |
|---|---|
| phthalazinone | 1.3 g |
| 2,2'-methylene-bis-(4-methyl-6-tert-butyl-phenol) | 4 g |
| polymethyl methacrylate | 5.8 g |
| methyl ethyl ketone | 70 g |

The results are shown in TABLE 4.

The stability of an unexposed film is expressed by (lux.sec which gives OD = 1.5 two months after the preparation)/(lux.sec which gives OD = 1.5 immediately after the preparation).

Here, the film storage conditions were 40° C. and 80% RH.

Here, the image stability is expressed by the variation rate of ODmax and ODmin immediately after the exposure and development and after the acceleration test. The conditions for the acceleration tests were 30 lux obtained by a tungsten lamp, 45° C., 80% RH or more and two months. In TABLE 4, the upper column indicates the decreasing rate of ODmax, while the lower column indicates the increasing rate of ODmin.

The samples for evaluating the stability of an unexposed film and the image stability were obtained from 20 portions of each roll film. They were evaluated and the average values were obtained. In order to prevent the variation of the film unrolling tension during the storage of the roll film, the ends of the film were securely fixed by a double-sided adhesive tape.

TABLE 4

| Experiment No. | Base Film Color | Base Film OD | Amount of Volatile Solvent (weight %) | Storage Types Type | Storage Types Tension (g/cm) | Stabiltiy of Unexposed Film | Image Stability Upper Column: ODmax Lower Column: ODmin |
|---|---|---|---|---|---|---|---|
| 1 Embodiment | Blue | 0.15 | 1.5 | Roll | 20 | 0.99 | 1 |
| | | | | | | | 0 |
| 2 Embodiment | Blue | 0.16 | 0.06 | Roll | 12 | 0.98 | 2 |
| | | | | | | | 1 |
| 3 Embodiment | Blue | 0.13 | 0.8 | Roll | 450 | 0.70 | 12 |
| | | | | | | | 10 |
| 4 Embodiment | Blue | 0.17 | 2.8 | Roll | 50 | 0.94 | 5 |
| | | | | | | | 4 |
| 5 Embodiment | Blue | 0.18 | 1.3 | Roll | 120 | 0.85 | 8 |
| | | | | | | | 8 |
| 6 Embodiment | Blue | 0.14 | 2.4 | Roll | 380 | 0.75 | 10 |
| | | | | | | | 9 |
| 7 Comparative Example | Blue | 0.15 | 4.0 | Roll | 30 | 0.51 | 19 |
| | | | | | | | 20 |
| 8 Embodiment | Blue | 0.15 | 1.4 | Overlapped Storage | — | 0.67 | 15 |
| | | | | | | | 14 |
| 9 Embodiment | Blue | 0.15 | 2.4 | Roll | 5 | 0.71 | 15 |
| | | | | | | | 13 |
| 10 Embodiment | Blue | 0.15 | 1.9 | Roll | 950 | 0.65 | 16 |
| | | | | | | | 18 |
| 11 Comparative Example | Blue | 0.15 | 4.2 | Overlapped Storage | — | 0.62 | 19 |
| | | | | | | | 19 |
| 12 Comparative Example | Blue | 0.15 | 0.01 | Roll | 23 | 0.58 | 20 |
| | | | | | | | 19 |
| 13 Comparative Example | Blue | 0.15 | 3.8 | Roll | 7 | 0.29 | 21 |
| | | | | | | | 20 |
| 14 Comparative Example | Blue | 0.15 | 4.0 | Roll | 700 | 0.27 | 25 |
| | | | | | | | 28 |
| 15 Embodiment | None | 0.03 | 1.8 | Roll | 20 | 0.62 | 15 |
| | | | | | | | 17 |

In order to measure an amount of a volatile solvent, gas chromatography (Diasolid L PEG) was used. The length of the column was 2 meters; the temperature was between 80° C. (maintained for six minutes) through 225° C.; the temperature rise rate was 20° C./min; acetic acid-n-butyl was used as an interior standard; and the solvent was ethyl Cellosolve acetate. The film was shredded and put in the solvent. The solution obtained by solving the silver salt composition with the solvent was measured by the gas chromatography.

From the above-described results, it is seen that the present invention can remarkably improve the stability of an unexposed film as well as the image stability.

EMBODIMENT 6

In the same manner as the procedure of the first embodiment, the dry roll film was prepared, except the base film was polyethylene terephthalate and its surface was roughened or colored. The results are shown in TABLE 5.

TABLE 5

| Experiment No. | Base Film Color | Base Film OD | Amount of Volatile Solvent (weight %) | Roll Tension (g/cm) | Stability of Unexposed Film | Image Stability Upper Column: ODmax Lower Column: ODmin |
| --- | --- | --- | --- | --- | --- | --- |
| 1 Embodiment | Blue | 0.15 | 1.5 | 23 | 0.86 | 5 |
|  |  |  |  |  |  | 0 |
| 2 Embodiment | Green | 0.17 | 1.5 | 21 | 0.80 | 13 |
|  |  |  |  |  |  | 11 |
| 3 Embodiment | Violet | 0.16 | 1.5 | 25 | 0.79 | 14 |
|  |  |  |  |  |  | 12 |
| 4 Embodiment | Red | 0.14 | 1.6 | 20 | 0.72 | 12 |
|  |  |  |  |  |  | 13 |
| 5 Embodiment | Orange | 0.14 | 1.6 | 23 | 0.71 | 13 |
|  |  |  |  |  |  | 13 |
| 6 Embodiment | Yellow | 0.15 | 1.5 | 20 | 0.70 | 15 |
|  |  |  |  |  |  | 14 |
| 7 Embodiment | White | 0.17 | 1.7 | 20 | 0.64 | 17 |
|  |  |  |  |  |  | 18 |
| 8 Embodiment | Black | 0.17 | 1.6 | 24 | 0.61 | 19 |
|  |  |  |  |  |  | 16 |
| 9 Embodiment | None | 0.07 | 1.5 | 21 | 0.59 | 20 |
|  |  |  |  |  |  | 22 |
| 10 Embodiment | None | 0.01 | 1.5 | 22 | 0.43 | 17 |
|  |  |  |  |  |  | 17 |

EMBODIMENT 7

A non-photosensitive dry roll film was prepared in the same manner as the procedure of the fourth embodiment, but the base film was made of a blue polyethylene terephthalate, and the optical density of the base film was varied to prepare samples.

FIG. 2 shows the density difference $\Delta$ OD and the image sharpness due to photographic fog in relation to the optical density of the base film. In this specification, the density difference due to photographic fog represents the difference in ODmin between the density measured immediately after the preparation of the film and the density measured after the acceleration test. The acceleration test conditions were 45° C., 80% RH and 50 days. In this case, the image sharpness is expressed by $$10^{ODmax} - 10^{ODmin}.$$

In order to practically use such a non-photosensitive dry silver salt rolled film, it is required that the difference in ODmin be not higher than 0.02 and the image sharpness be not lower than 90. For instance, when this film is used as microfilm and when the developed image is viewed through a microfilm reader or is printed out, it is difficult to understand or read the image unless the sharpness of the image is 80 or more.

In view of the above-described results, it is understood that the optical density must be within a range from 0.05 to 1.0 and more preferably not lower than 0.1 and not higher than 0.3.

EMBODIMENT 8

Figure 16:
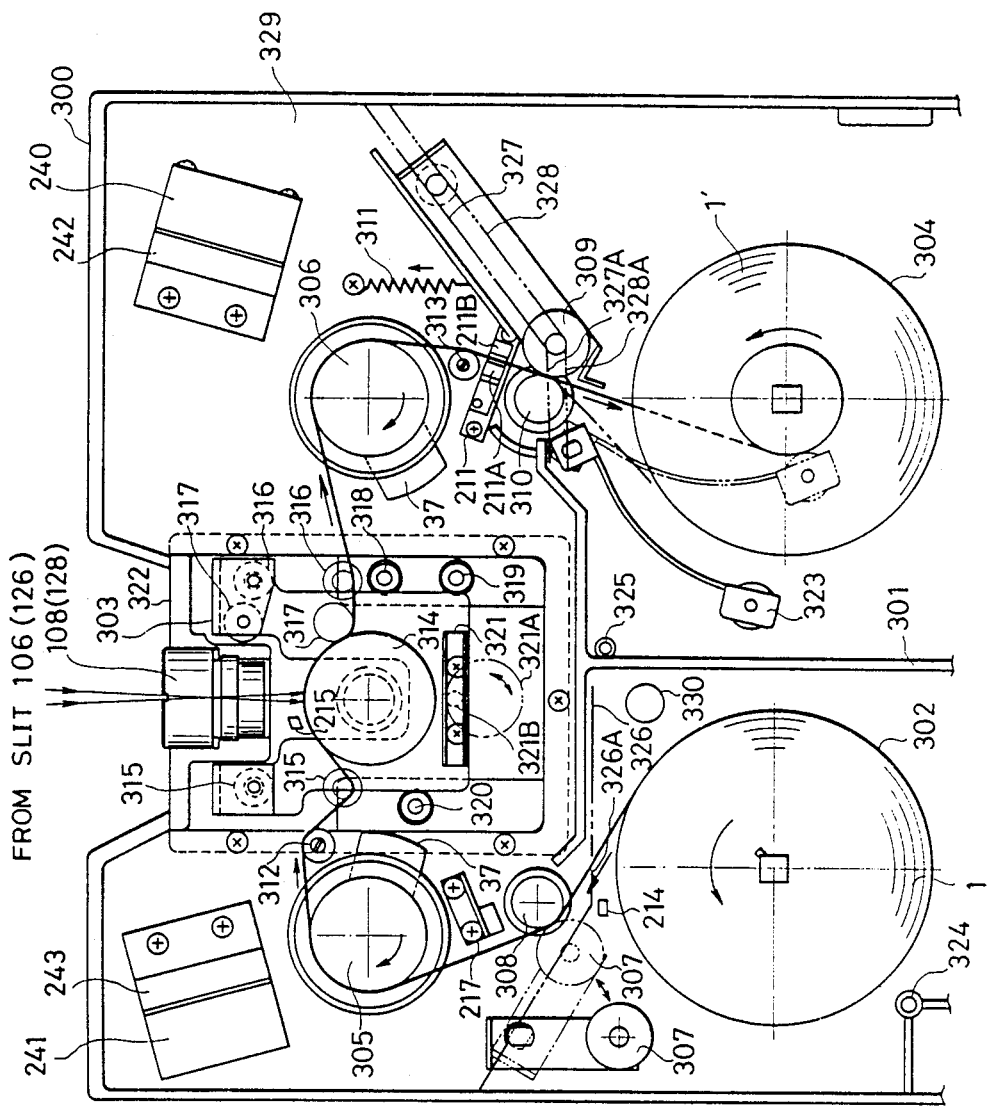
FIG. 16 is a schematic diagram showing an embodiment of the film processing system in the microphotography camera in accordance with the present invention.

As shown in FIG. 16, in a rotary type microphotography camera system for use with a 16 mm film which is to be thermally developed, a photointerrupter 211 having a width of 2 mm in the direction of the width of the film and a length of 0.25 mm in the direction of the travel film was disposed on the downstream side of a thermally developing means 306 so as to detect the variations in optical density of the developed film. Since the microphotography camera system was of the Duplex type, the position of the photointerrupter 211 was made movable to a film position corresponding to the respective center portions of the two side of the original.

On the other hand, a standard original prepared was 92×214 mm in size and alphanumeric characters of 6–10 points were printed on the front surface of the original, while a completely black zone of 9×9 mm in size was marked at the center of the original. Furthermore, in order to detect the synchronization, fine lines of 1.8 line pair/mm and 2.5 pair/mm were printed in the peripheral portion of the original, so that the front surface of the standard original had a reflectivity of about 70%. The reflectivity of the rear surface of the standard original was about 90%.

Next, the 16 mm roll film prepared in the first embodiment was loaded into the rotary type camera and the above-described standard original was photographed and developed and at the same time it was confirmed to count the number of originals photographed on the film. The results of the experiment are shown in TABLE 6.

TABLE 6

| Experimental Conditions | Set Point of the lowest optical density | Set Point of the highest optical density | Position of photo-interruptor | Results |
| --- | --- | --- | --- | --- |
| 1 | 0.4 | 0.9 | Film position corresponding to the front surface of the original | Good |
| 2 | 0.4 | 0.9 | Film position corresponding to the rear surface of the original | Good |
| 3 | 0.6 | 0.6 | Film position corresponding to the surface of the original | Good |

In this experiment, the size reduction ratio was 1/40; the image portion on the film was about 2.3 mm in length; and the image pitch was about 0.3 mm.

The original travel speed was 400 sheets/minute. It was found that under the above-described conditions it is possible to detect an original image spaced apart from each other by a pitch of 0.3 mm and to recognize the existence of the image.

EMBODIMENT 9

Figure 15:
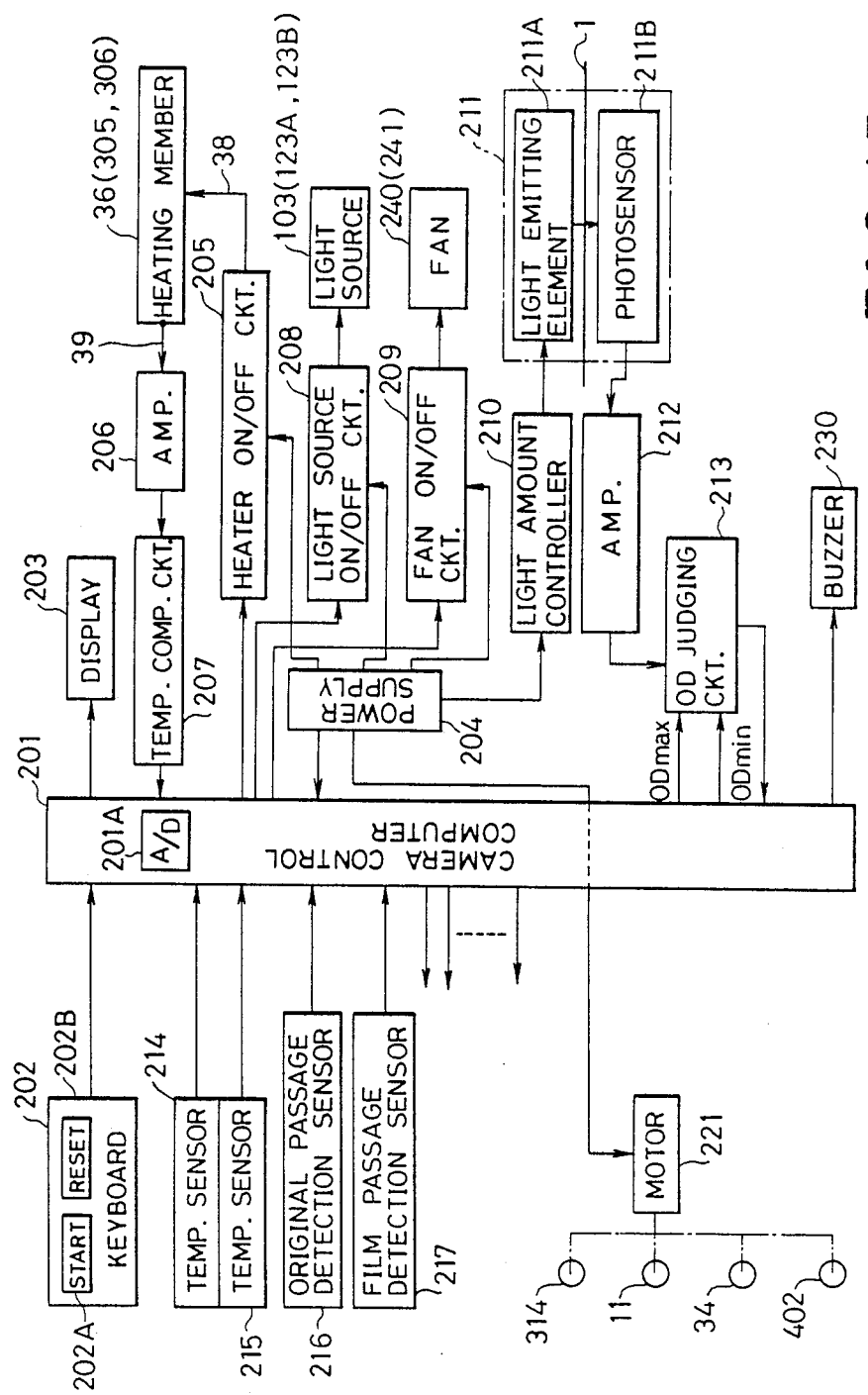
FIG. 15 is a block diagram showing an embodiment of an electric circuit in the microphotography camera system in accordance with the present invention.

In the eighth embodiment, a photosensor 215 (see FIG. 15) for detecting the travel of an original is disposed in the original travel system of the rotary type camera, as shown in FIG. 16, and the output from this sensor 215 is applied to a computer 201 shown in FIG. 15 so as to count the number of originals travelled.

Furthermore, the number of the travelled originals and the number of the frames of the developed images are compared by the computer 201, so that the counted number of the photographed image frames is displayed on a liquid crystal display device 203. Moreover, when the number of the travelled originals does not coincide with the number of the photographed image frames, an electronic buzzer 230 is energized. This rotary type camera can eliminate the step for confirming the formation of an image by a reader or visually, it becomes extremely simple to photograph bills, checks and other valuable documents.

EMBODIMENT 10

In order to confirm the positions of the major component units in the rotary type camera for use with a film to be thermally developed, the positions of the following units are changed to examine the storage conditions of an unexposed film.

These units are listed below and the experimental results are shown in TABLE 7.

(1) An optical system for forming a size-reduced image on a film surface and a film guide system for guiding the film to travel at a predetermined position of the optical system;

(2) A system for storing and unrolling an unexposed film; and (3) A roller film heating system including a heating roller which is made into contact with the rear surface of a photosensitive layer so as to heat the film and a nip roller for uniformly pressing the film against the heating roller.

TABLE 7

| Experiment No. | Positional relationship of the units | Temperature rise of the unit (2) after 40 minutes of continuous use test |
| --- | --- | --- |
| 1 Embodiment | (3) is disposed above (1) and (2) ((1) and (2) have substantially the same height.) | $\Delta T = 4.6°$ C. |
| 2 Embodiment | The respective units are disposed from the top to the bottom in the sequence of (3), (1) and (2). | $\Delta T = 3.2°$ C. |
| 3 Comparative Example | The respective units are disposed from the top to the bottom (2), (1) and (3). | $\Delta T = 18.7°$ C. |

In order to design the rotary type camera compact in size, each unit is so disposed that the length of the film passage therein is about 35 cm and the closest distance between the heating roller and the unexposed film storage unit and the unrolling unit was 7 cm in experiment No. 1 and was about 12 cm in experiment Nos. 2 and 3.

EMBODIMENT 11

In the layout in accordance with experiment No. 1 in the tenth embodiment, the shielding plates made of ABS resin and having various thicknesses are provided between the units (1) and (2). Except that the slit for passing the film was 18 mm $\times$ 0.8 mm in size, the remaining portions of the shielding plate were completely closed with a black rubber plate (Experimental conditions 1–3). In the upper portion of the interior of the unit (2) having a shielding plate completely identical with the shielding plate described above, an opening having a diameter of about 20 mm was formed and a compact exhaust fan was provided in the opening. A duct having a length of about 30 cm and in the form of a black opaque flexible tube was connected to the end of the exhaust fan (Experimental conditions 4–6).

Under the experimental conditions for each camera system, the continuous camera operation test for 160 minutes per day was continued for about one week and the variation range in the minimum optical density (photographic fog density) and the variation range in the maximum optical density were measured. The results are shown in TABLE 8.

The roll films used in the experiments were 16 mm roll films prepared by the procedure of the first embodiment and were 30.5 m in length. Four roll films were continuously exposed per one day.

TABLE 8

| Experimental conditions | Thickness of ABS shielding wall | Positive pressure in unit (2) | Brightness in unit (2) | $\Delta OD_{max}$ | $\Delta OD_{min}$ | Remarks |
| --- | --- | --- | --- | --- | --- | --- |
| 1 | 0.6 | 0 | 0.1 lux or less | 0.05 | 0.05 | — |
| 2 | 1.6 | 0 | 0.1 lux or less | 0.05 | 0.04 | — |
| 3 | 2.0 | 0 | 0.2 lux or less | 0.04 | 0.04 | — |
| 4 | 1.6 | 0.2 mmHg | 0.1 lux or less | 0.03 | 0.02 | The flexible tube was bent by an angle of 180°. |
| 5 | 1.6 | 0.4 mmHg | 0.3 lux | 0.03 | 0.04 | The flexible tube was bent by an angle |

TABLE 8-continued

| Experimental conditions | Thickness of ABS shielding wall | Positive pressure in unit (2) | Brightness in unit (2) | ΔODmax | ΔODmin | Remarks |
|---|---|---|---|---|---|---|
| 6 | 1.6 | 0.4 mmHg | 6 lux | 0.08 | 0.05 | of 90°. The flexible tube was extended straightly. |

As to ΔODmax and ΔODmin, the optical densities were measured at 1000 points of each roll film at random and ΔODmax and ΔODmin were obtained as 3δ of the respectively measured densities.

EMBODIMENT 12

The rotary type camera in accordance with experimental condition 1 in embodiment 11 was used as a model. A safety device was provided in which when a temperature detected by a thermocouple sensor attached to a heating body 36 shown in FIG. 15 rises in excess of the set temperature 35° C., a power supply 204 is interrupted by an ON-OF circuit 205. The continuous exposure test at room temperature of 25° C. was made under the same experimental conditions as embodiment 11.

The safety device was operated twice a day and it took only about ten minutes per one occurrence to decrease the temperature down to room temperature. According to the same evaluation method as that described above in 11th embodiment, the minimum optical density (photographically fogged density) variation range was 0.02, while the maximum optical density (image density) variation range was 0.03. Thus, it was confirmed that both the minimum and maximum optical densities can be remarkably improved.

EMBODIMENT 13

The model in accordance with experimental condition 2 in the embodiment 11 was used for about three months for durability test. It was found out that the number of exposed image frames which were set as in case of embodiment 9 became abnormal. It was presumed that this abnormality was resulted from the contamination of an optical density sensor 211 due to its continuous usage for a long period of time.

Therefore, a compact exhaust fan 240 with a filter 242 using inorganic fiber system was disposed above the heating roller in the roll film heating system, thereby cleaning the air in the roll film heating system. In this improved model, no abnormality of the optical density sensor 211 was recognized even after the long durability test lasting for about 10 months. Furthermore, as to the variation ΔODmax in the image density due to the variation in room temperature (between 15° C. and 30° C.) between summer and winter seasons, there was recognized an effect in that ΔODmax was suppressed to 0.03, as compared with ΔODmax=0.07 in the model which was not improved.

EMBODIMENT 14

Figure 3:
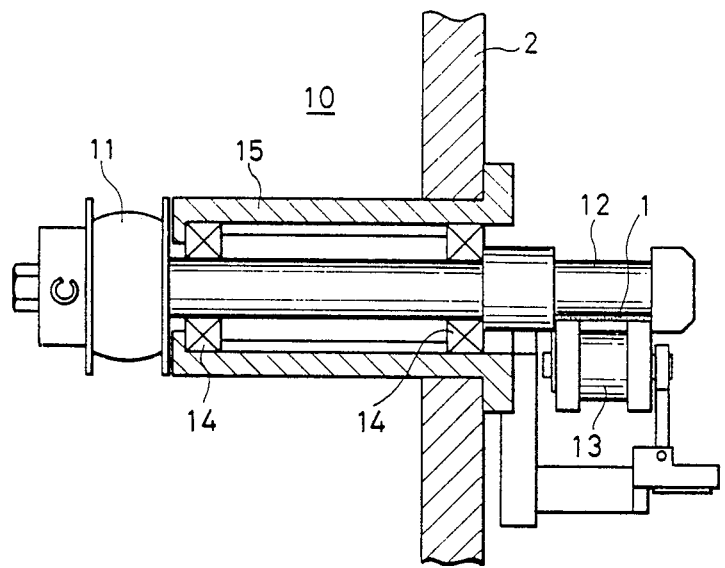
FIG. 3 is a sectional view showing an embodiment of the travelling means in the present invention.

FIG. 3 shows a sectional view of an embodiment of means for travelling a roll film in a camera system in accordance with the present invention.

In FIG. 3, the film travel means is generally indicated by reference numeral 10. In the travelling means 10, reference numeral 11 denotes a driving pulley for receiving a driving force through a flat belt from a driving source in the form of a motor 221 shown in FIG. 15. Reference numeral 12 denotes a drive shaft for transmitting the driving force received by the driving pulley 11 to a roll film 1. Reference numeral 13 denotes a nip roller for pressing the driving shaft 12 so that the rotating force or torque of the driving shaft 12 is securely transmitted to the roll film 1. That is, the roll film 1 is pressed against the driving shaft 12 by the nip roller 13. Reference numeral 14 denotes bearings which ensure smooth rotation of the driving shaft 12. Reference numeral 15 denotes a housing for supporting the driving shaft 12 to the base 2 perpendicularly to the base 2. The driving shaft 12 is rotatably supported via the bearings 14 to the housing 15.

Further, the portions which are shown in FIG. 3 but are not explained are holding means for holding the nip roller 13 and the like.

With this film travel means 10, the nip roller 13 is pressed against the driving shaft 12 which is rotating at a predetermined rotational speed, so that the roll film 1 is pressed against the driving shaft 12 under the pressing force and thus the rotating force or torque of the driving shaft 12 is transmitted to the roll film 1. As a result, the roll film 1 travels at a predetermined speed.

Figure 4:
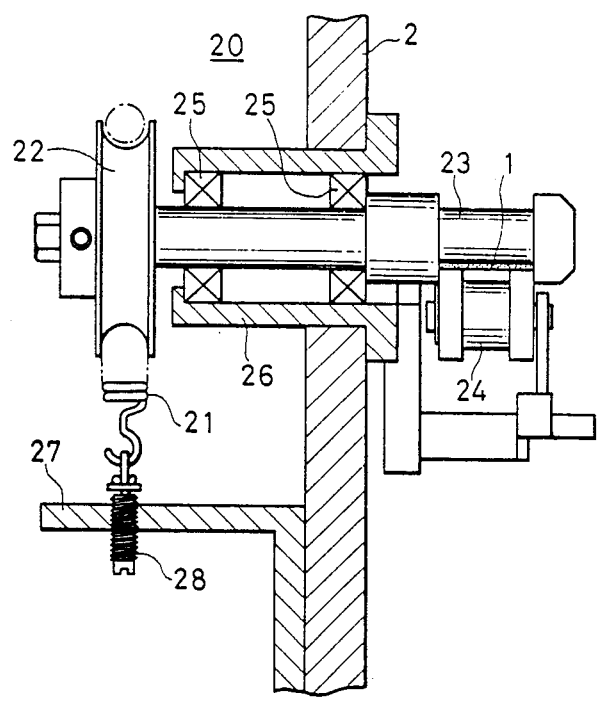
FIG. 4 is a sectional view showing an embodiment of the tension means in the present invention.

FIG. 4 shows a sectional view of an embodiment of a tension means in a camera system in accordance with the present invention.

In FIG. 4, the tension means is generally indicated by reference numeral 20. In the tension means 20, reference numeral 21 denotes a spring, both ends of which are securely fixed to the base 2 and the spring 21 is wrapped around a tension pulley 22. The tension pulley 22 is secured to one end of a tension roller 23. The tension roller 23 is rotatably supported to the base 2. Reference numeral 24 indicates a nip roller for pressing the roll film 1 against the roller surface of the tension roller 23. Reference numeral 25 denotes bearings for rotatably supporting the tension roller 23 and reference numeral 26 denotes a housing which supports the bearings 25 in such a way that the tension roller 23 is supported to the base 2 perpendicularly to the base 2.

Further, the portions which are shown in FIG. 4 but are not explained are holding means for holding the nip roller 24 and so on.

According to the tension means 20 shown, the spring 21 wrapped around the tension pully 22 provides a braking force to the tension roller 23 and then the braking force is applied to the roll film 1. The braking force applied to the roll film 1 can be varied by adjusting the tension of the spring 21. To this end, for instance, a screw 28 is adjustably coupled to a supporting plate 27 protruding from the base 2 in such a way that the screw 28 is moved upwardly or downwardly. The screw 28 and one end of the spring 21 are rotatably coupled to each other, so that the tension of the spring 21 can be adjusted by moving the screw 28 upwardly or downwardly. As a result, the braking force to be applied to the film 1 can be adjusted by adjusting the tension.

Figure 5:
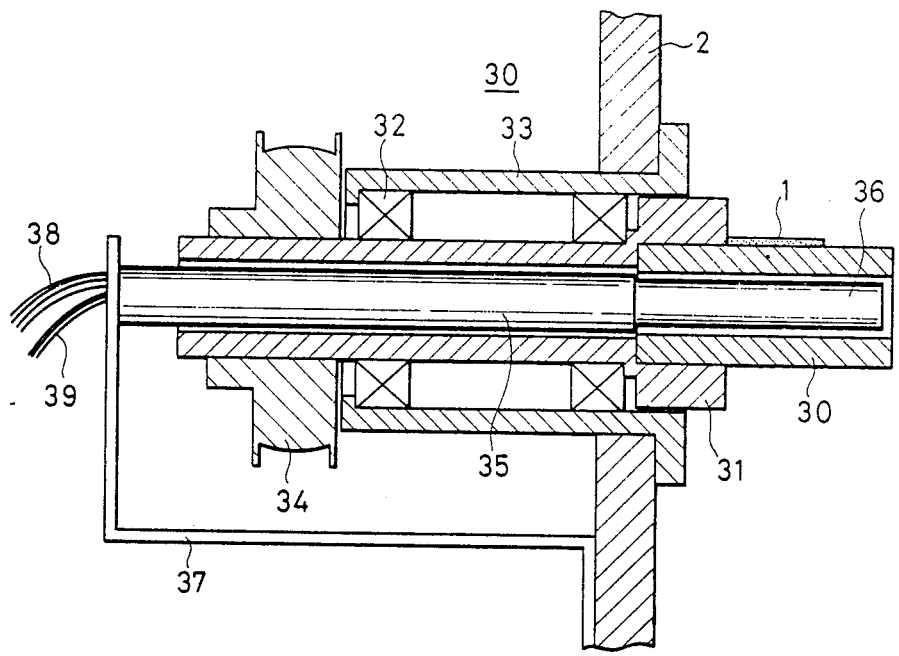
FIG. 5 is a sectional view showing the roll heater, the rotating means, the holding means and a heating control means in the present invention.
Figure 6:
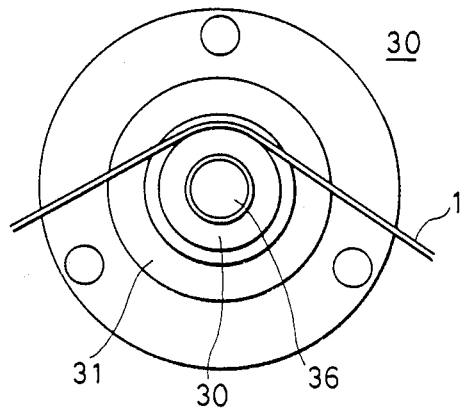
FIG. 6 is a front view showing the structure of FIG. 5.

FIG. 5 is a sectional view showing an embodiment of a portion consisting of a roller heater, a rotating means for rotating the roller heater, a holding means and a heating control means in a camera system in accordance with the present invention. FIG. 6 is a front view of this portion.

Here, a roller heater 30 is mounted to the holding means such as a cylindrical roll heater holder 31. The roller heater holder 31 is mounted to the base 2 perpendicularly to the base 2 by bearings 32 and a housing 33.

The rotating means comprises, for instance, a roller heater pulley 34 securely attached to the left end of the roller heater holder 31. A rotating force from the driving source in the form of the motor 221 as shown in FIG. 15 is transmitted through a flat belt (not shown) to the roller heater pulley 34, so that the roller heater holder 31 is rotated through the bearings 32.

The bake means comprises a heating member 36 mounted to the hollow portion of the roller heater 30 without contacting the roller heater 30 and a heated holder 35 which is secured coaxially to the heating member 36 and supports the heating member 31 without contacting the holder 31 in the hollow portion of the roller heater holder 31. When the heating member 36 is heated, the roller heater 30 is heated by the thermal conduction through the air layer and radiative heat conduction.

It is preferable to use as the heating member 36 a heating unit in which a thermocouple sensor is incorporated, for example, a unit known as "Wire Rod Cartridge Heater". Lead wires 38 of the heating member 36 and lead wires 39 of the thermocouple are extended from a heater holder mounting plate 37 which supports the other end of the heater holder 35. As shown in FIG. 15, the output from the thermocouple is amplified by a sensor output amplifier (for instance, μPC254, a product of NEC) 206 in the form of a voltage amplifier comprising an operational amplifier. The amplifier output is applied through a temperature compensation circuit 207 (for instance, μPC3911, a product of NEC) to an A/D converter 201A (for instance, ADC 0802LCN, a product of National Semiconductor) incorporated in a camera control computer 201 containing Z 80 as a central processing unit, so that the amplifier output is converted into the digital signal in the A/D converter 201A. In response to the digital signal thus obtained, the computer 201 has a function of controlling the temperature of the heating member 36 in such a way that the roll film 1 is heated at a temperature equal to or higher than a softening point temperature of the materials of the film 1. The temperature control signal is applied to a heater ON-OFF circuit such as a solid state relay 205, so that the supply of electric power from a power supply 204 to the heating member 36 is turned on or turned off, whereby the temperature of the heating member 36 is maintained at a constant value.

Since the heating member 36 is maintained at a constant temperature, the roller heater 30 is also maintained at a constant temperature. By balancing this heating and heat dissipation, the roller heater 30 is controlled to be heated at a temperature lower than that of the heating member 36.

As shown in FIG. 6, the film 1 is wrapped around the roller heater 30, whose heating is controlled in the manner described above, even a predetermined angle, so that the film 1 is heated.

Figure 7:
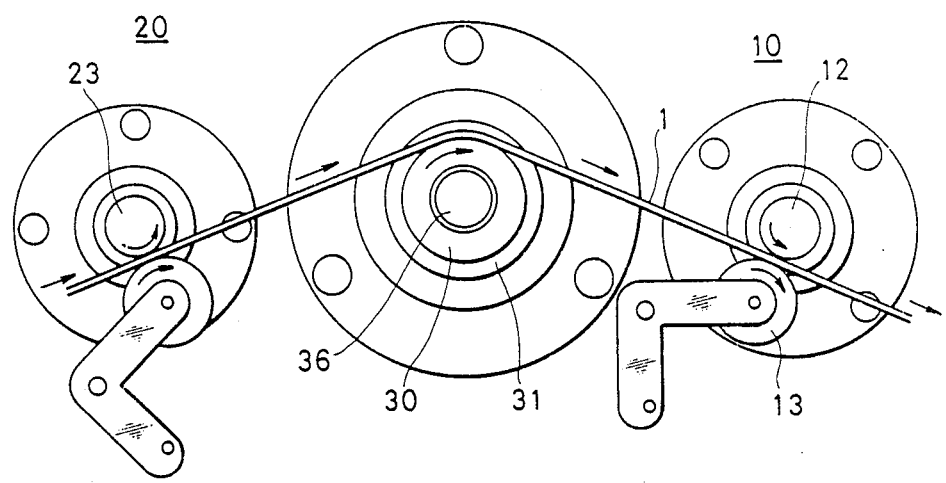
FIG. 7 is a front view showing an embodiment of the entire heating roller device.

FIG. 7 shows an embodiment of a whole arrangement of a roll film heater comprising in combination the film travel means 10, the tension means 20, the roller heater 30, the holding means 31, the rotating means 34 and the control means 35, 36 shown in FIG. 3 through FIG. 6.

In this embodiment shown, the tension means 20 is disposed on the downstream side of the tape travel means 1 for travelling the roll film 1 in the direction of the film travel. The roller heater 30, the film travel means 10 and the tension means 20 are so arranged that the base surface (not-coated surface) of the roll film 1 is wrapped and made into contact with the roller heater 30 over a predetermined angle between the film travel means 10 and the tension means 20. The tension means 20 is so adjusted that the tension applied to the film 1 between the film travel means 10 and the tension means 20 becomes 5–250 g/mm$^2$ per unit cross sectional area of the roll film 1, so that the roll film 1 is made into contact with the roller heater 30 and is heated.

The surface temperature of the roller heater 30 is controlled, for instance, at 130° C. Here, the film 1 is 16 mm in width, 0.14 mm in thickness and 30.5 m in length and has no perforation and is of the type generally called a 16 mm roll film.

Within the tension range between 5–250 g/mm$^2$, the lower limit represents the minimum tension required for making the film 1 into intimate contact with the roller heater 30. The upper limit of the tension range represents the tension when the film 1 which is being heated is heated at a temperature equal to or higher than the softening point temperature of the film 1 so that the film 1 is easily stretched and consequently it becomes difficult to satisfy the standard values defined in JIS K7541-1984.

According to K7541, for instance, the allowance of the width of the 16 mm roll film is 16.00–15.9 mm. The main reason why JIS K7541-1984 is not satisfied is that when the 16 mm roll film is heated under the tension of 250 g/mm$^2$, the roll film having a width of 16.00 is stretched in the longitudinal direction thereof, so that the width of the film 1 becomes narrower than 15.9 mm.

Preferably, the tension range is between 50–150 g/mm$^2$. The minimum limit within this range, represent a limit in the case of slitting of a roll film (that is, in the case of forming a plurality of roll films having a small width from a roll film having a wide width). That is the limit is determined to present the slitted side portions from being stretched so that they do not contact the roller heater 30. As to the maximum limit of this range, if a stretch in the longitudinal direction of the film is determined corresponding to the entire tolerable range of the standard value of the film width, an allowable width is not obtained when a roll film is manufactured and accordingly the yield is decreased. Thus, the maximum limit is determined to avoid this.

According to the present invention, in the roll film heater, the roll film 1 is pressed into intimate contact with the roller heater 30 by the tension and is heated, for instance, at 130° C. The present invention has an important feature, therefore, that no other force other than tension is applied to the film, which is being heated, so that the film 1 is prevented from being scratched or otherwise damaged.

However, when the travel speed of the film 1 and the speed of the roller heater 30 in the tangential direction of the outer periphery thereof are different, the surface of the base of the film 1 is damaged. In view of the above, it is preferable that both the speeds coincide. If rotational speeds of an exposure roller 314 for driving the film 1 and the roller heater pulley 34 are suitably selected in relation to the speed of the motor 211 shown in FIG. 15, so that a speed ratio between a speed of the outer diameter of the roller heater 30 which is rotating in its tangential direction and a travel speed of the roll film 1 may be determined to be 1-0.95, when the film travel speed is defined as 1, the film has no serious marring causing trouble. More preferably, the speed of the roller heater 30 in the rotating tangential direction is determined to be 1-0.99. This speed is a travelling speed determined by taking the stretch of the roll film 1 travelling over the roller heater 30 into consideration.

Figure 8:
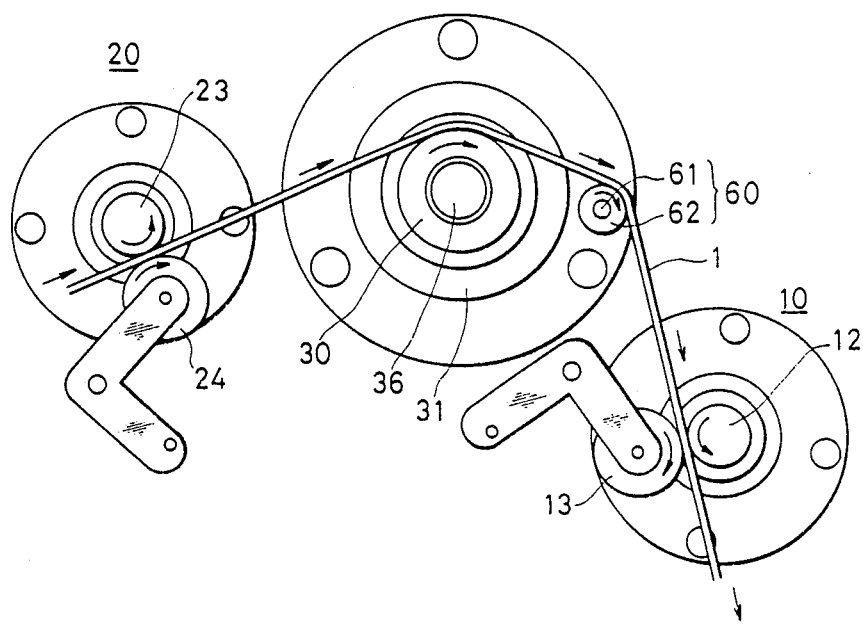
FIG. 8 is a front view showing another embodiment of the entire heating roller device.

FIG. 8 shows another embodiment of the roll film heater.

The roll film heater shown in FIG. 8 has, in addition to the roll film heater shown in FIG. 7, cooling means 60 for cooling the film 1 to a temperature equal to or lower than its softening point when it is heated in excess of its softening point. The colling means 60 is interposed between the film travel means 10 and the roller heater 30.

The cooling means 60 comprises, for instance, a shaft 61 and a rotating cooling roller 62 rotatably supported by the shaft 61.

The cooling roller 62 for cooling the roll film 1 is made of a material having relatively high thermal conductivity and is made into contact with the heated film 1 so as to dissipate the heat therefrom.

After the roll film 1 has been heated in excess of the softening point of the film 1, it is made into contact with the cooling roller 62, so that it is cooled below its softening point. After being cooled, the film 1 is clamped between the driving shaft 12 and the nip roller 13 and is travelled in the direction indicated by the arrow.

Next, the softening point of the film 1 is described in detail with respect to two points.

The first softening point is a softening point of the coated layer of the film 1 and is within the range between 50° and 90° C. depending upon the kinds of the emulsion. The second softening point is a softening point of the base film (base) which is also varied depending upon the materials of the base film. Since the base film is mostly of polyester base or polyacetate base, so that the range of the softening point of the base film is between 80° and 110° C.

In the case of using a dry silver salt photographic roll film 1 having a coated layer whose softening point is about 60° C. in the embodiment shown in FIG. 7, and when the roll film 1 is heated at, for instance, 120° C. by the roller heater 30, it is required that the film travel speed be decreased or that the distance between the roller heater 30 and the film travel means 10 be increased, in order to cool the film 1 at a temperature lower than 60° C. by heat dissipation before a time point that the film 1 is clamped by the driving shaft 12 and the nip roller 13 which constitute the film travel means 10.

When the softening point of the coated layer of the film 1 is 65° C., the surface temperature of the roller heater 30 is 135° C. and the distance between the roller heater 30 and the film travel means 10 is 50 mm in the embodiment shown in FIG. 7, the film 1 suddenly have many marrings after it is heated, if the travel speed of the film 1 exceeds 50 mm/min, and furthermore marrings are increased in size.

The reason is that the film 1 is clamped between the driving shaft 12 and the nip roller 13 and a force for travelling the film 1 is applied to the film 1 before the film 1 is cooled at a temperature equal to or lower than 65° C. which is the softening point of the coated layer of the film 1.

It is needed that the cooling roller 62 be first made into contact with the surface of the base of the film 1.

In the embodiment shown in FIG. 8, the same roll film as used in the embodiment shown in FIG. 7 is used. In the case where the distance between the roller heater 30 and the cooling roller 62 is 25 mm and the distance between the cooling roller 62 and the film travel means 10 is 40 mm, a film travelling speed at which the film 1 has no marring exceeds 1 m/min.

In the rotary type camera processor field in which the possibility of using the film heaters of the type described above is the highest, the exposure speed is mostly of the order of 1 m/min in terms of film speed, so that it is clear that the film heater in accordance with the present invention can be satisfactorily practical.

As described above, in the present invention, the film heater for heating for a predetermined time an elongated dry silver salt photographic roll film continuously at a temperature equal to or higher than the softening point equivalent to Gauss transition point of the roll film material comprises a travel means for travelling the roll film, a tension means for producing a force resisting against the travel of the roll film, a rotating means for rotating a cylindrical roller heater made of a material having a good thermal conductivity, a holding means for holding the roll film in such a way that the rotating tangential direction of the roller heater coincides with the direction of travel of the roll film and a control means for controlling the roller heater to heat at a predetermined temperature. The tension means is disposed on the downstream side of the travelling means for travelling the film in the direction of the film travel and the roller heater is so disposed that the surface of the base (non-coated surface) of the roll film is wrapped around and made in contact with the roller heater over a predetermined angle between the film travel means and the tension means. The tension means is so adjusted that the tension applied to the film between the film travel means and the tension means is 5-250 g/mm$^2$ per unit cross sectional area of the roll film, so that the roll film is heated, while it is made in contact with the roller heater.

Furthermore, it is preferable that means for cooling the roll film heated in excess of the softening point to a temperature equal to or lower than the softening point is interposed between the film travel means and the roller heater.

Moreover, in a preferred embodiment of the present invention, a speed ratio of a speed of the outer diameter of the rotating roller heater in the rotating tangential direction in relation to a speed of the film travel is selected to be 1-0.95, when a travel speed of the roll film is defined as 1.

According to the present invention, it becomes possible to heat the dry silver salt film under predetermined heating conditions by the film heater of the type described above in a simple manner and inexpensively and in addition without damaging the roll film.

In addition, the roll film heater in accordance with the present invention has achieved the important technical subject for replacing a wet type silver salt film by a dry silver salt film or the problem of ensuring the heating of a dry silver salt film in predetermined heating conditions in a simple manner in a rotary type camera processor, so that it is expected that the rotary type camera processor can be made compact in size and maintenance-free. Furthermore, it is expected that a clean office can be realized and that the office automation can be further enhanced.

EMBODIMENT 15

Figure 9:
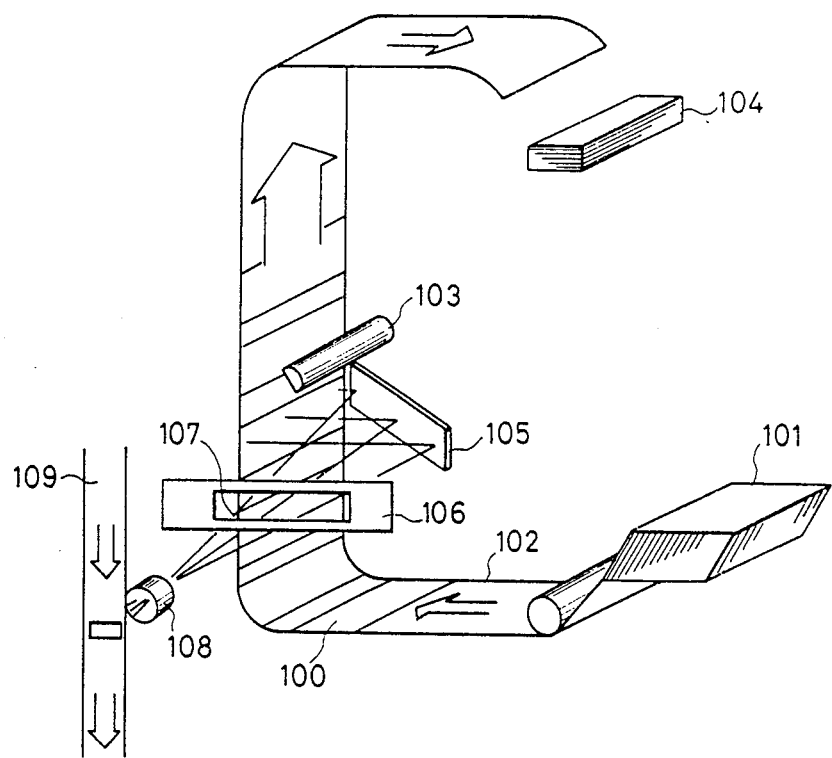
FIG. 9 is a schematic view showing an embodiment of a microphotography camera system in accordance with the present invention.

FIG. 9 schematically shows an embodiment of a rotary type microphotography camera in accordance with the present invention in which an illumination distribution of an original is not uniform.

For the sake of simplicity, the number of reflecting mirrors is reduced in FIG. 9 and a supporting member and a travel mechanism for each component part are not shown.

In FIG. 9, originals 100 are stacked in an auto feeder 101. The auto feeder 101 automatically inserts the originals 100, one by one, into an original travel mechanism 102.

The original 100 is travelled to a stocker 104 through an illumination zone where the original 100 is illuminated by the light emitted from an illumination device 103 by the original travel mechanism 102.

The illumination device 103 illuminates the original 100 placed in the illumination zone and the light reflected from the original 100 is further reflected by a reflecting mirror 105 and then introduced into a photographic lens 108 through a slit-shaped opening 107 of a slit plate 106. The image of the original 100 is size-reduced and imaged upon a photographic film 109 by the photographic lens 108. The illumination device 103 emits an illumination light such that the illumination in the peripheral portion of the original 100 is higher than the illumination in the center portion thereof.

The direction in which the original 100 is travelled is opposite the direction in which the photographic film 109 is travelled, as shown in FIG. 9 and the respective travel speeds are in proportion to a size reduction ratio. As shown in FIG. 16, two exhaust fans 240 and 241 are disposed on both sides of the illumination device 103 substantially corresponding to the position of the slit plate 106.

In the present invention, the slit-shaped opening 107 in the slit plate 106 is in the form of rectangle.

This is resulted from the fact that the illumination device 103 produces such an illumination distribution that the illumination in the peripheral portion of an original is higher than the illumination in the center portion thereof. The optical density of an image in one frame exposed on the film 109 is uniform.

According to embodiment 15 shown in FIG. 9, an ideal lens having no optical deflects such as shading or the like is used as the photographic lens 108 and at the same time, the illumination device 103 is used in such a way that the illumination in the peripheral portion of an original becomes equal to a value obtained by dividing the illumination in the center portion of the original by the fourth power of the cosine of an incident angle defined between the axis connecting the peripheral portion of the original to the lens and the optical axis. In addition, the slit-shaped opening 107 is in the form of complete rectangle. As a result, the optical density of an image formed in one frame of the film 109 can be made uniform.

Figure 10:
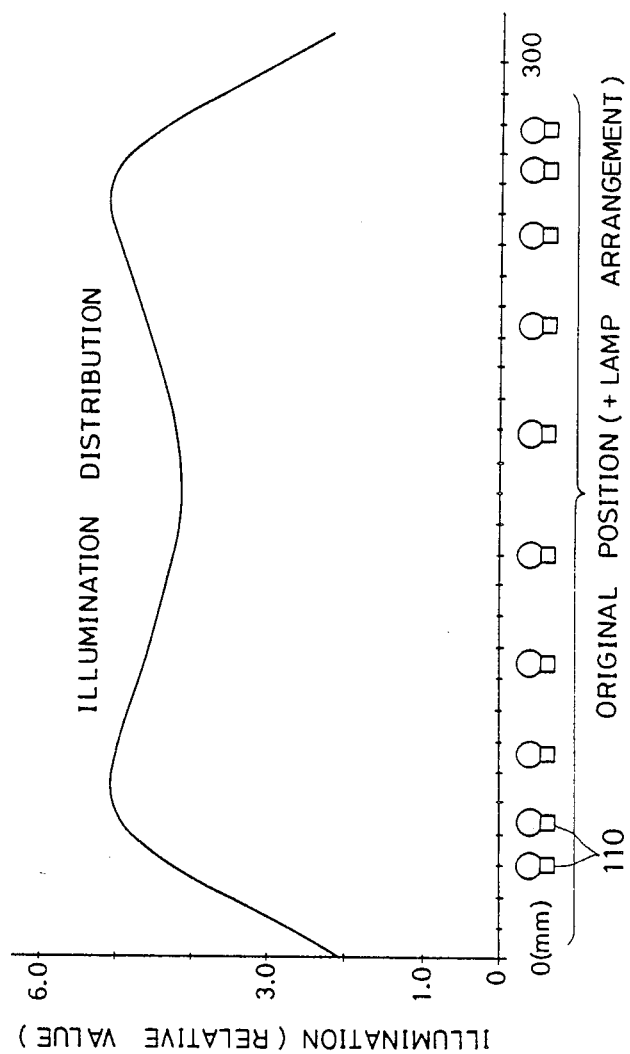
FIG. 10 is a profile illustrating an illumination distribution obtained by the illumination light source and the arrangement of the lamps thereof.

FIG. 10 is a graph illustrating an illumination distribution of an original illumination obtained when the arrangement of lamps 110 (for instance, halogen lamps, tungsten lamps or the like) of the illumination device 103 and the reflecting plate 105 used in embodiment 15 are taken into consideration.

FIG. 10 shows the result obtained by computing the illumination distribution on an original in accordance with a simulation program for computing an illumination of an original illumination, with inputting data concerning the arrangement of the lamps 100, the intensity of light emitted from the lamps 110, the position relationship between the lamps 110 and the original 100, the position relationship between the lamps 110 and the reflecting plate 105 and the material of the reflecting plate 105 into an electronic computer. The illumination distribution result shown in FIG . 10 is well coincident with the actual illumination distribution.

According to the present invention, the arrangement distance between the adjacent lamps 110 in the illumination device 103 is made intentionally non-uniform. That is, as shown in FIG. 10, the lamps 110 are disposed thinly in the central portion and densely in the peripheral portion (both ends), so that the illumination distribution of the original illumination is determined in such a way that the illumination in the peripheral portion is the reciprocal number of the fourth power of the cosine of the incident angle in relation to the illumination in the center portion of the original. According to actual measurements, it was confirmed that the original was illuminated within the range between +5% and 0% of the above-described target illumination distribution thus determined.

The light source of the illumination device 103 may be a halogen lamp of double base type having two bases at both ends and fabricated by encapsulating a plurality of filaments of halogen lamps in a single glass tube. In this case, it is sufficient that the distance between the adjacent filaments is the same as the distance arrangement as shown in FIG. 10.

More specifically, the illumination device 103 in accordance with the present invention can attain the decrease in power consumption and cost as well as the reduction in heat, increase to the extent that the illumination device 103 is not arranged to have a lamp arrangement in which the distance between adjacent lamps is close in the center portion in order to increase the illumination in the original center portion. In embodiment 15, such illumination device 103 and the slit plate 106 having a rectangular slit-shaped opening 107 are used so that the optical density of the image in one frame of the film becomes uniform. Furthermore, since the illuminations in the peripheral portion of the original is higher than the illumination in the center portion thereof, the photographic speed can be increased accordingly.

The photographic lens 108 used in embodiment 15 has a view angle of 34° and the illumination in the peripheral portion of the original is determined to be 20% higher than that in the center portion thereof.

In the case of embodiment 15, the actual photographic speed was 48–72 m/min and the highest photographic speed was attained at the time of the maximum rating of the lamp source.

COMPARATIVE EXAMPLE

Figure 11:
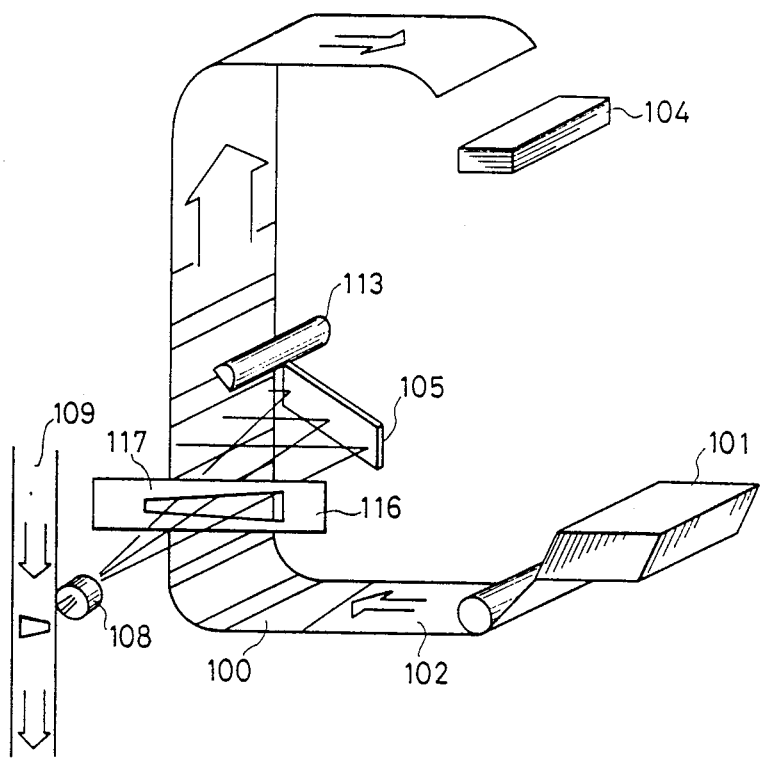
FIG. 11 is a schematic view illustrating one example of a conventional microphotography camera system.

For the sake of comparison, FIG. 11 schematically shows a conventional rotary type microphotography camera in the form substantially similar in construction to the embodiment of the present invention shown in FIG. 9.

The rotary type microphotography camera in this comparative example is different from embodiment 15 in the illumination device 113, the illumination distribution attained thereby, the slit plate 116, the original travel speed and the photographic film travel speed.

The illumination 113 is so designed and constructed to uniformly illuminate the original 100 and in order to attain a uniform image density in one frame of the film, the slit-shaped opening 117 of the slit plate 116 is made in the form of sector. In this comparative example, the same lens as the photographic lens 108 in embodiment 15 is used, so that the photographic lens 108 has a view angle of 34° and the maximum incident angle is 17°.

In an ideal case, the slit-shaped opening 117 is defined by a curve (the fourth power of a cosine), but an actual machining cost becomes very expensive in order to form such an opening 117. Therefore, an ideal curve is replaced by straight line segments approximating the ideal curve, so that the width at the center of the slit-shaped opening 117 is 80% of the width at both ends thereof and consequently the optical density of the image exposed in each frame does not become uniform.

In addition, a cost of the step for defining the slit-shaped opening 117 in the form of sector is more expensive than the cost for defining a rectangular opening.

The illumination over the original by the illumination device 113 is so determined to be equal to the illumination in the original center portion attained by the illumination device 103 of embodiment 15. The maximum width of the sector-shaped slit opening 117 is equal to the width of the slit-shaped opening 107 in embodiment 15, so that the original travel feed speed and the film travel speed (photographic speed) are decreased (by 80%) to the extent that the width in the center portion of the slit-shaped opening 117 of the slit plate 116 is narrow. In the case of the comparative example, the photographic speed measured was 40–60 m/min.

Figure 12:
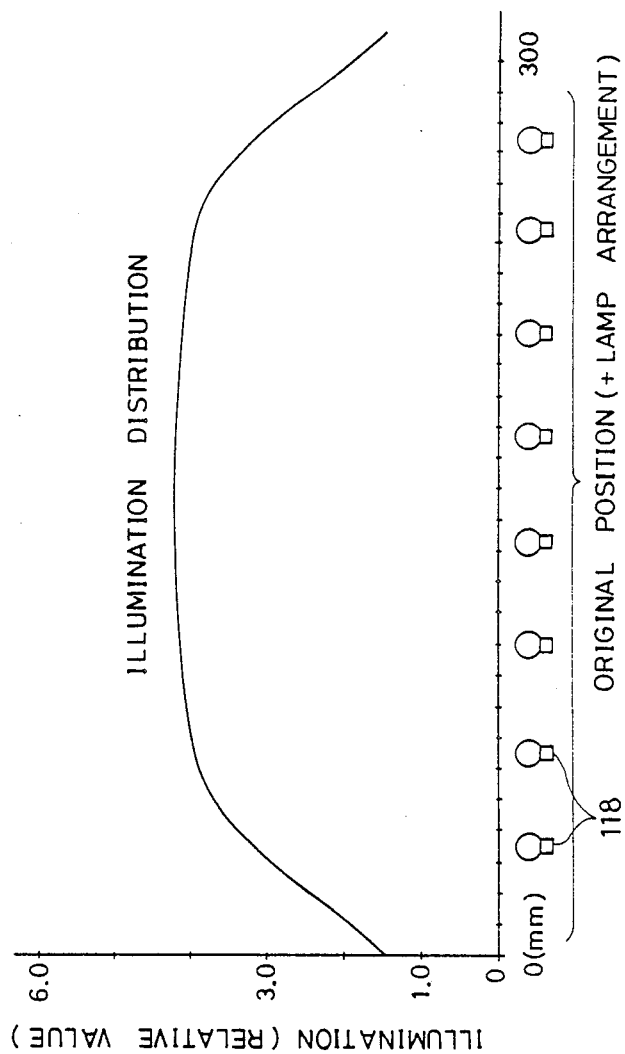
FIG. 12 is a profile illustrating an illumination distribution obtained by the illumination light source thereof and the arrangement of the lamps thereof.

FIG. 12 is a graph illustrating the arrangement of the lamps 118 of the illumination device 113 used in the comparative example and the illumination distribution attained thereby. In the illumination device 113 of the conventional rotary type microphotography camera, the lamps 118 are spaced apart from each other substantially equidistantly, as shown in FIG. 12, so that the uniform illumination distribution can be obtained on the original.

In both of embodiment 15 and the comparative example, the lens 108 which causes no decrease in peripheral light amount due to shading or the like, so that the photographic speed in the comoparative example is as low as of the order of 80%, as compared with the photographic speed attained by embodiment 15. When an inexpensive photographic lens is used, the photographic speed is further lowered.

EMBODIMENT 16

Figure 13:
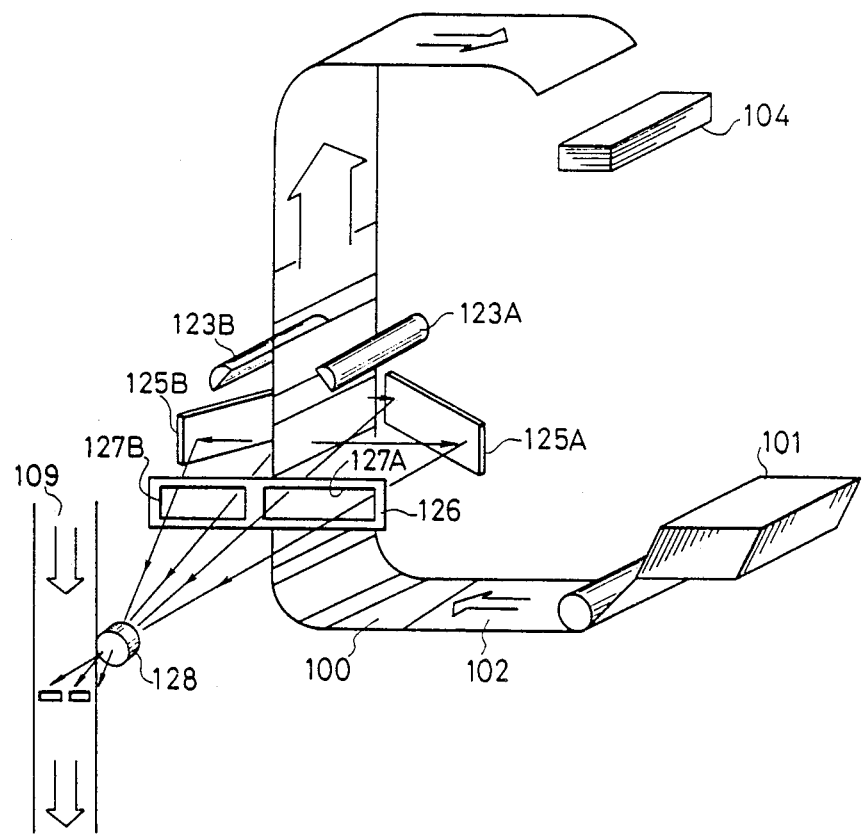
FIG. 13 is a schematic view showing another embodiment of the microphotography camera system in accordance with the present invention.

FIG. 13 shows another embodiment of a rotary type microphotography camera in accordance with the present invention which produces a non-uniform illumination distribution over an original.

This embodiment 16 is different in photographic mode from the embodiment 15 and is of the Duplex type capable of photographing the images on both surfaces of an original simultaneously.

In embodiment 16, the originals 100 are also carried in a manner substantially similar to that described above in embodiment 15, but embodiment 16 is different from embodiment 15 in illumination devices 123A and 123B, reflecting mirrors 125A and 125B, two slit-shaped openings 127A and 127B of a slit plate 126, a photographic lens 128 and so on.

When the original 100 passes through the illumination zone, both the surfaces of the original 100 are simultaneously illuminated and the lights reflected from the original 100 are reflected again by the reflecting mirrors 125A and 125B, respectively, which are disposed in opposed relationship with both the surfaces of the original 100. The reflected lights from the reflecting mirrors 125A and 125B pass through the slit-shaped openings 127A and 127B, respectively, and then are introduced into the common photographic lens 128 to be imaged on the photographic film 109 and exposed.

Figure 14:
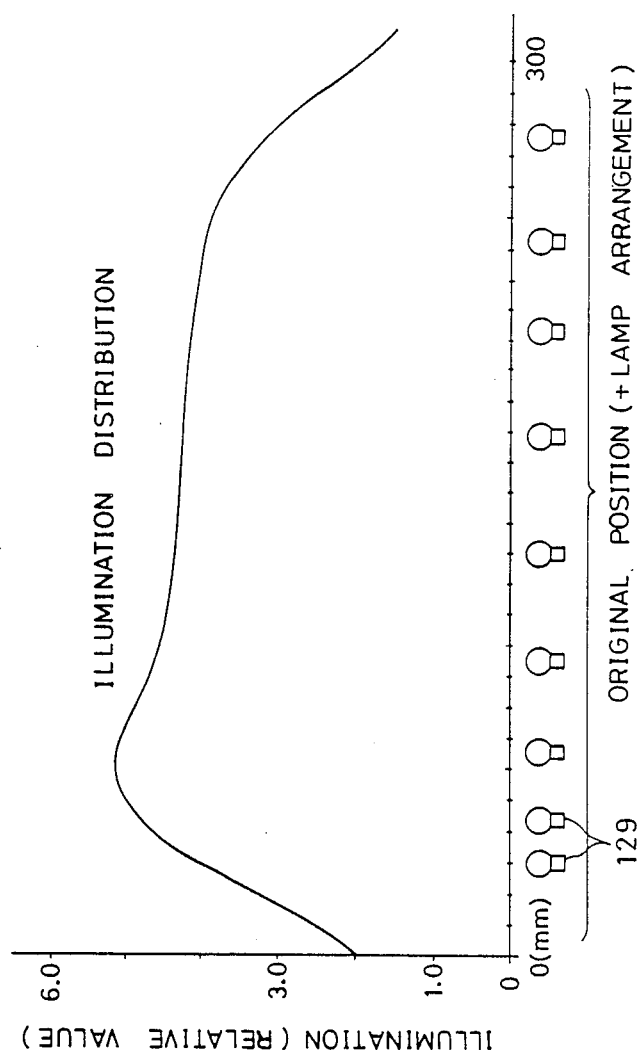
FIG. 14 is a profile illustrating an illumination distribution obtained by the illumination light source thereof and the arrangement of lamps thereof.

The illumination distributions obtained by illuminating the original by the illumination device 123A and 123B are different from the illumination distribution (FIG. 10) obtained by the illumination device 103 in embodiment 15. FIG. 14 shows the arrangement of lamps 129 in each of the illumination devices 123A and 123B and the illumination distribution (the illumination is higher on one side).

The photographic lens 128 used in embodiment 16 causes some shading, so that the illumination devices 123A and 123B each for obtaining a non-uniform illumination distribution compensate for the decrease in illumination due to the shading of the lens 128 in addition to the decrease in illumination in proportion to the fourth power of the cosine of an incident angle.

According to embodiment 16, the illumination distributions over both the surfaces of the original are controlled by a density of an arrangement of the lamp 129, so that an amount of heat produced from the portion in which the lamps are densely arranged in the illumination devices 123A and 123B to illuminate the original with a high illumination becomes large, but an amount of heat produced from the other portion is not substantially different from that in the case of the conventional illumination device 113.

Since both the surfaces of an original are simultaneously photographed, the portions having a high illumination by the illumination devices 123A and 123B of embodiment 16 are concentrated on one side so that it is sufficient to arrange only one cooling fan for heat dissipation on that side; that is, in a portion above the slit plate 126. Therefore, embodiment 16 has advantages in that it is simple in construction and it can be fabricated at a low cost.

When a lens which is the same as the photographic lens 108 used in embodiment 15 is used as the photographic lens 128 and if the size-reduction ratio is the same, an incident angle of the lens 128 is increased twice or more and the photographic speed is increased to a speed higher than the photographic speed by embodiment 15 which was compared with the comparative example.

In embodiment 16, the view angle of the photographic lens 128 is 40° and in order to compensate for the decrease in illumination due to the shading of the lens 128, the illumination devices 123A and 123B illuminate the original in a manner that the illumination distribution on each surface of the original by each of the illumination devices is such that the illumination in the original peripheral portion is higher by 40% or more than the illumination in the original center portion.

In embodiment 16, the photographic speed measured was 44–66 m/min.

EMBODIMENT 17

FIG. 15 shows one embodiment of an electric circuit of a microphotography cameral system in accordance with the present invention. In FIG. 15, reference numeral 201 represents a computer for controlling the camera and incorporates therein, for instance z80 as a central processing unit. Reference number 201A denotes an A/D converter in the computer 201 for converting an analog signal applied to the computer 201 into a digital signal. Reference numeral 202 denotes a keyboard having a start key 202A for instructing the start of an exposure, a reset key 202B for resetting the number of originals which are counted by the computer 201 in response to the detection of the original passage by an original passage detecting sensor 216 and other various operation keys. Reference numeral 203 denotes a display device such as a liquid crystal display device, a plasma display device, a cathode ray tube (CRT) or the like for displaying the number of exposures counted by the computer 201, alarm signals generated by the computer 201, and so on. Reference numeral 204 denotes a power supply for the whole microphotography camera system including the control system such as the computer 201, a heating member 36, a light source 103 (123A, 123B), an exhaust fan 240, a light emitting element 211A of a photointerrupter 211, a buzzer 230, a motor 221 and so on.

Reference numeral 205 denotes an ON-OFF circuit for permitting or interrupting the supply of an electric power from the power supply 204 to the heating member 26. Reference numeral 206 denotes an amplifier for amplifying a temperature detection output by a thermocouple sensor mounted on the heating member 36 and may be of a voltage amplifier by an operational amplifier. Reference numeral 207 denotes a temperature compensation circuit for accomplishing the temperature compensation for the output from the amplifier 206 and the output of the temperature compensation circuit 207 is applied to the A/D converter 201A.

Reference numeral 208 denotes an ON-OFF circuit for permitting or interrupting the supply of an electric power from the power supply 204 to the light source 103. The temperature of the unexposed film 1 in the storage means such as a supply reel 302 around which the unexposed film 1 is wound as shown in FIG. 16 is detected by a temperature sensor 214. When the computer 201 judges that the detected temperature exceeds a set temperature, for example, a temperature within a range higher than room temperature (room temperature is defined to be a temperature of the order of 5°-30° C. in this specification) by 5°-15° C. or a predetermined temperature of, for instance, 45° C., the computer 201 interrupts the ON-Off circuit 208 and/or the ON-OFF circuit 205 connected to the heating means 305 and 306.

Reference numeral 209 denotes also an ON-OFF circuit for permitting or interrupting the supply of an electric power from the power supply 204 to the circulation fans 240 and 241. The temperature of the film 1 in the vicinity of a focal plane of, for instance, an exposure roller 314 shown in FIG. 16 in the optical means for exposure is detected by a temperature sensor 215 and in response to the detected temperature, the computer 201 controls the ON-OFF circuit 209 so as to drive the fans 240 and 241 in such a way that the temperature of the film 1 is controlled within the range between 15°-55° C.

Reference numeral 210 denotes a light amount controller for controlling an electric power supplied from the power supply 204 to the light emitting element 211A of the photo interruptor 211 and may be formed by a variable resister. The photo interruptor 211 is a sensor for detecting the optical density of the film 1 and the light emitted from the light emitting element 211A such as a light emitting diode (LED) is received by a photosensor 211B. The output from the photosensor 211B is amplified by an amplifier 212 and then applied to an optical density judging circuit 213. The maximum optical density ODmax and the minimum optical density ODmin are set in the computer 201 from the keyboard 202. Further, these set values of the maximum and minimum optical densities may be previously set in the manufacturing process of cameras instead of setting them by the computer 201. The optical density judging circuit 213 compares the output from the amplifier 212 with the set points of ODmax and ODmin, respectively. The computer 201 counts the number of comparison outputs exceeding ODmax as the number of frames, which is displayed on the display device 203. When there exists no comparison output less than ODmin, i.e., when the output from the amplifier 212 is not lower than ODmin, the computer 201 judges that the film 1 is photographically fogged or the film storage conditions are unsatisfactory. Then, the computer 201 activates an alarm buzzer 230 and/or displays a warning information on the display device 203. The optical density judging circuit 213 may comprise two comparators which compare the output from the amplifier 212 with the set values of ODmax and ODmin.

Figure 17:
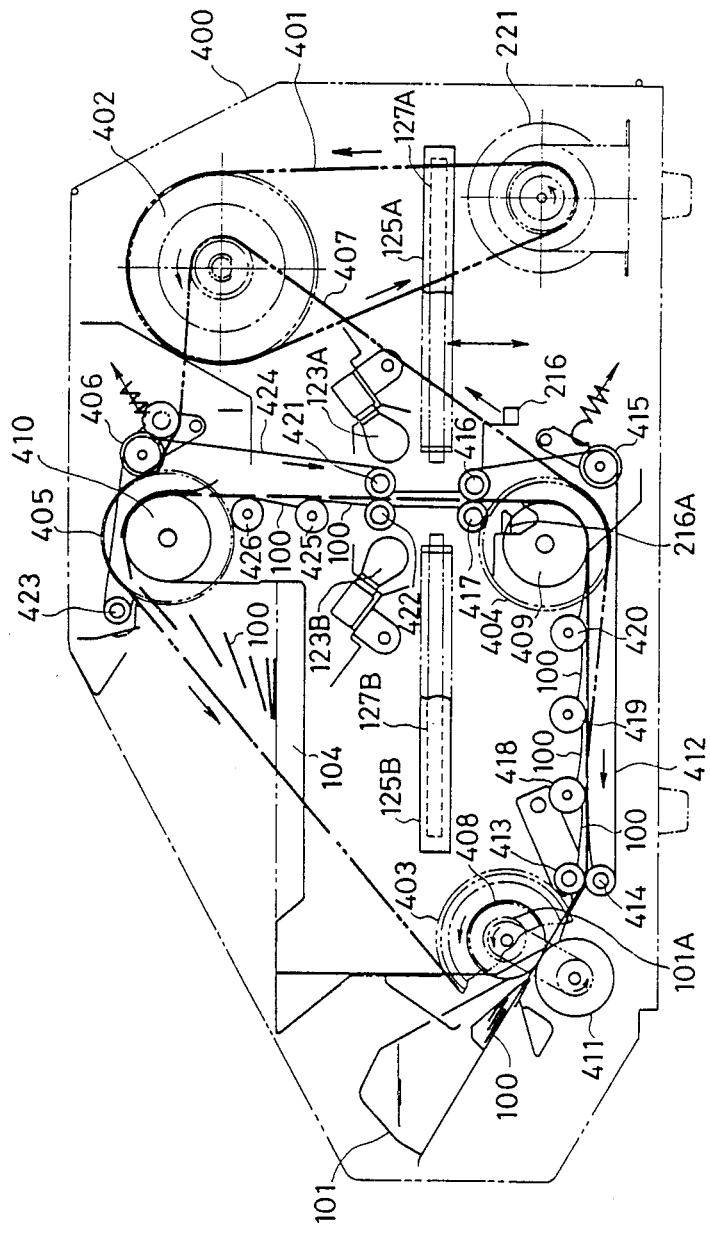
FIG. 17 is a schematic diagram showing an embodiment of the original travelling system in the microphotography camera system in accordance with the present invention.

Reference numeral 216 denotes a photosensor for detecting the passage of the original 100 through the optical system in the original feed system shown in FIG. 17. In response to the interruption of light incident to the sensor 216 from a lamp 216A by the original 100, the passage of the original 100 is detected. The number of detections of the originals 100, i.e., the number of the originals is stored in the computer 201. When the number of the originals does not coincide with the counter number of the frames described above, the computer 201 instructs the buzzer 230 so as to produce warning sound and/or instructs the display device 203 to display warning information on the display device 203.

EMBODIMENT 18

FIGS. 16 and 17 show a specific embodiment of a film processing system comprising the storage means for storing unexposed film 1, the unrolling means, the first and the second heating means, the optical means and the discharge means and the original feed system for feeding the originals 100 to the optical means in a microphotography camera system in accordance with the present invention of teh type using normally non-photosensitive dry silver salt roll film.

In FIG. 16, reference numeral 300 represents a housing and a light shielding partition plate 301 substantially in the form of T is disposed at the center in the lower half portion thereof. Reference numeral 302 denotes a supply reel which is disposed on the left side of the partition plate 301 and stores the unexposed film 1. Reference numeral 303 denotes a film loading plate which is disposed at a position above the partition plate 301 and on which rollers 315, 316 and 317 are mounted. Reference numeral 304 denotes a take-up reel which is disposed on the right side of the partition plate 301 and is adapted to wind the developed film 1'.

Reference numeral 305 denotes the first heating means for heating the unexposed film 1 travelled from the supply reel 302 through a nip roller 307, which constitutes the unrolling means, and a tension roller 308 made in contact with the nip roller 307 so as to activate the unrolled unexposed film 1 from the reel 302. Reference numeral 306 denotes the second heating means for thermally developing the film upon which an image is exposed in a size-reduced manner by the exposure optical means. The first and second heating means 305 and 306 can be designed and constructed in a manner substantially similar to that described above with reference to FIGS. 3–8 and are disposed above the supply reel 302.

A sensor 217 for detecting the passage of the film 1 is interposed between the supply reel 302 and the first heating means 305. The sensor 217 detects the existence of the film 1 and when the sensor 217 does not detect the existence of the film 1, an original feeding electromagnetic clutch 101A of the automatic original feeder 101 (see FIG. 17) is de-energized and the light source ON-OFF circuit 208 is turned off. Under these conditions, the photographic exposure process is completed, but the motor 221 is kept energized until the exposed film is developed and wound around the take-up reel 304.

A photointerrupter 211 as an OD detection sensor is arranged between the second heating means 306 and the take-up reel 304.

Reference numerals 309 and 310 indicate a nip roller and a driving roller, respectively, which coact so as to travel the developed film 1' from the second heating means 306 to the take-up reel 304. In order to press the developed film 1' against the driving roller 310, the nip roller 309 is loaded with a bias spring 311 so that the roller 309 is pressed against the driving roller 310.

The first and second heating means 305 and 306 are mounted on the heater holder supporting plates 37 for supporting the heating member 36 as shown in FIG. 5, so that the first and the second heating means 305 and 306 are securely attached to the housing 300 by the plates 37.

Reference numerals 312 and 313 represent cooling rollers, respectively, for cooling the unexposed film 1 discharged from the first heating means 305 and the developed film 1' discharged from the second heating means 306, respectively.

Reference numeral 314 indicates an exposure roller which is driven by the motor 221 to feed the film 1 and which is adapted to accurately image a size-reduced original through the lens 128. The film is partially wrapped around the exposure roller 314 over a predetermined angle by guide rollers 315 and 316 and nip roller 317. The photographic lens 108 images the light to the top of the exposure roller 314 as shown.

Bearings 318, 319 and 320 are disposed so that the film loading plate 303 is vertically movable. That is, when the film is loaded, the film loading plate 303 is moved upwardly, so that the rollers 315, 316 and 317 are brought to the positions indicated by the broken lines. Under this condition, the film 1 is loaded. Thereafter, the film loading plate 303 is moved downwardly, so that the rollers 315, 316 and 317 are brought to the positions indicated by the solid lines. Under this condition, the exposure step is ready to be carried out.

Reference numeral 321 denotes a spring plate in the form of channel and reference numeral 321A denotes a film setting member having a protruded pin 321B which engages with the inside of the channel of the spring plate 321. In response to the rotation of the film setting plate 321A, the loading plate 303 is caused to move upwardly or downwardly, so that the pin 321B presses the spring plate 321. As a result, the roller 317 is pressed through the film 1 against the exposure roller 314, whereby it is ensured that the film 1 is driven by the exposure roller 314. Reference numeral 322 denotes a mounting plate for securely mounting the photographic lens 108 to the housing 300.

Reference numerals 240 and 241 denote circulation fans disposed substantially above the second and the first heating means 306 and 305, respectively. The circulation fans 240 and 241 include filters 242 and 243, respectively.

Reference numeral 323 denotes a film guide lever for ensuring the winding of the leading edge of the developed film 1' around the take-up reel 304. Reference numerals 324 and 325 denote slide pins which are adapted to move the nip roller 307 and the film guide lever 323 from the positions indicated by the solid lines to the positions indicated by the broken lines when a cover 329 is closed. Reference numerals 326, 327 and 328 represent black rubber plates which coact with the partition plate 301 in such a way that the supply reel 302 and the take-up reel 304 are isolated from the first and second heating means 305 and 306 and the optical system 303. The black rubber plates 326, 327 and 328 are mounted to the cover 329 which closes the housing 300 and which is located above the paper plane of FIG. 16, so that the interiors of the supply and take-up reels 302 and 304 are tightly closed. In this case, however, the black rubber plates 326, 327 and 328 have slits 326A, 327A and 328A, respectively, which permit the passage of the unexposed film 1 and the developed film 1' therethrough.

Reference numeral 330 indicates an opening of a duct through which cooling air is supplied to the unexposed film 1 wound around the supply reel 302. The duct 330 is made of a light shielding material, so that the light from the original illumination light sources 123A and 123B shown in FIG. 17 and the exterior light can be prevented from leaking into an accommodating space which is defined by the partition plate 301 and the black rubber plate 326 and in which the supply reel 302 is accommodated. As a result, the illumination in such housing space must be made not higher than 5 lux at the most.

It is preferable that air is introduced into the accommodating space through the duct 330 so that the pressure in the accommodating space is maintained at a positive pressure equal to or higher than 0.1 mm $H_2O$.

FIG. 17 shows an embodiment of the original feed system.

In FIG. 17, reference numeral 400 denotes a housing of the original feed system and reference numeral 401 denotes a motor belt for transmitting the driving force from the motor 211 to a driving pulley 402. Reference numerals 403, 404 and 405 denote timing pulleys disposed substantially at the vertexes, respectively, of a right-angled triangle between the automatic original feeder 101 and the zone for illuminating the original 100. They are driven via a belt tension pulley 406 and a driving belt 407 in the form of a timing belt by the driving pulley 402.

Rubber rollers 408, 409 and 410 are attached to the pulleys 403, 404 and 405, respectively. A rubber roller 411 is disposed so that the rubber roller 411 presses the rubber roller 408. Each original 100 is fed to a first feed belt 412 from the automatic original feeder 101 by the rubber rollers 408 and 411. This feed belt 412 passes from a portion between rubber rollers 413 and 414, through the tension pulley 415 and through a portion between rubber rollers 416 and 417 to the rubber roller 409, and then returns to the rubber roller 414. Between the rubber rollers 409 and 414, a plurality of pulleys 418, 419 and 420 are disposed so that the original 100 fed one sheet by one sheet at a time is pressed against the feed belt 412 by the pulleys 418, 419 and 420, whereby the feeding of the original 100 is ensured. A second original feed belt 424 is extended between the rubber rollers 409 and 410, passing from a portion between rubber rollers 421 and 422, which are disposed relatively on the downstream side of the illumination zones of the light sources 123A and 123B, through the rubber roller 410 and a tension pulley 423. Reference numerals 425 and 426 denote pulleys which serve to positively press the original 100 against the feed belt 424.

When the motor 221 is energized so that the driving pulley 402 is rotated in the direction indicated by the arrow, the first and the second feed belts 412 and 424 move in the directions indicated by the arrows, respectively, so that the original 100 fed from the automatic original feeder 101 passes from a portion between the rubber rollers 408 and 411, through a portion between the rubber rollers 413 and 414, the pulleys 418, 419 and 420, the rubber roller 409, a portion the rubber rollers 416 and 417, a portion between the rubber rollers 421 and 422, and the pulleys 425 and 426, to the rubber roller 410 and then is discharged into the stacker 104.

Figure 18:
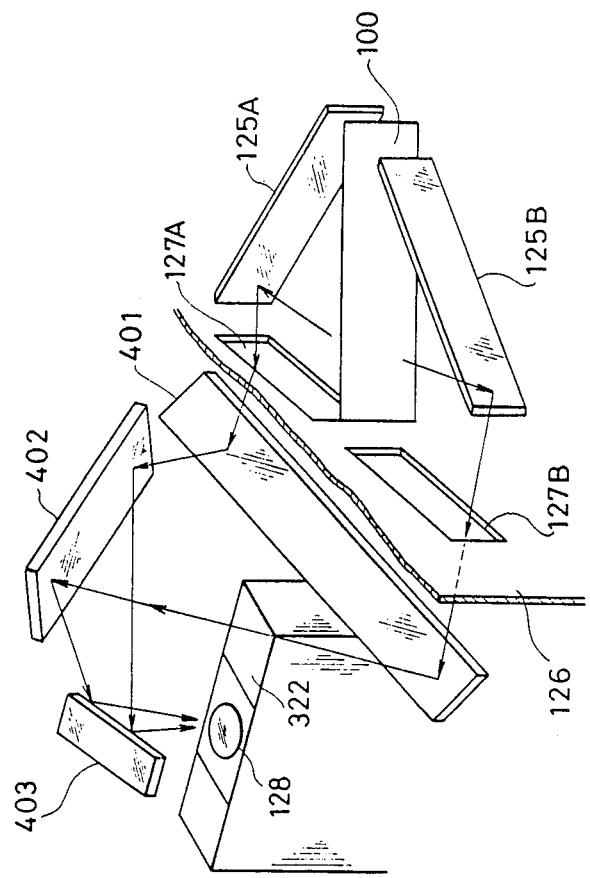
FIG. 18 is a perspective view showing an embodiment of the optical system from the slit to the photographic lens in the microphotography camera system in accordance with the present invention.

The light reflected from the original 100 which is illuminated by the light sources 123A and 123B; that is, the output light is again reflected by the reflecting mirrors 125A and 125B and then passes through the slit-shaped openings 127A and 127B to the lens 128 through, for instance, an optical system as shown in FIG. 18. In FIG. 18, reference numeral 401 indicates a reflecting mirror for reflecting the light which has passed through the slit openings 127A and 127B. The propagating direction of the light is deflected by 90° by the reflecting mirror 401 and the reflected light is further reflected by reflecting mirrors 402 and 403 by 90°, respectively, so that each light is directed the lens 128.

EMBODIMENT 19

Figure 19:
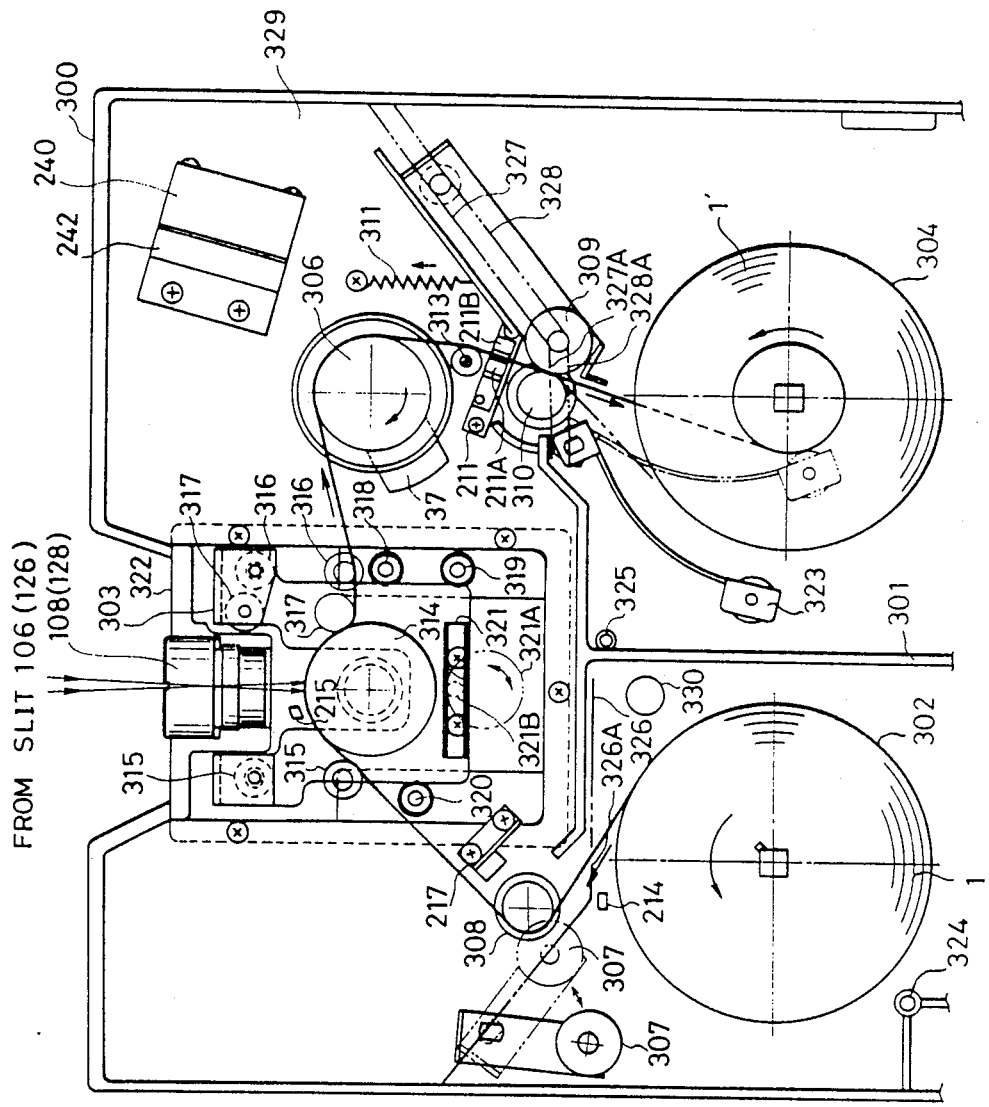
FIG. 19 is a schematic diagram showing another embodiment of the film processing system in the microphotography camera system in accordance with the present invention.

FIG. 19 shows another specific embodiment of the film processing system of a microphotography camera system in accordance with present invention of the type using normally photosensitive dry silver salt roll films.

In this embodiment, the film used is normally photosensitive, so that the heating means 305 for activating the film of the type described above is not required. The film 1 is directly guided from the supply reel 302 through a pair of rollers 307 and 308 to an exposure roller 314 through a guide roller 315 without passing through the heating means 305. The film sensor 217 is disposed along the film passage between the rollers 308 and 315.

Except the above-described arrangement, the remaiging portions in embodiment 19 from the optical means through the thermal development means to the discharge means is substantially similar to the embodiment described above with reference to FIG. 16, so that further explanation of embodiment 19 is omitted.

INDUSTRIAL APPLICABILITY

According to the present invention, when a dry silver salt roll film is stored, the hardness of the roll film is maintained at a predetermined value, so that no air layer exists between the rolled film layers and consequently the unexposed film can be stored for a long period of time in a stable manner. Furthermore, the base film for the unexposed film has a predetermined optical density and a predetermined tension is applied to the film in a predetermined form (in the condition that the film is wound in the form of a roll). In addition, an amount of solvent contained in the composition is so controlled as to be withing a predetermined range. As a result, the stability of the dry silver salt film can be remarkably improved.

The rotary type microphotography camera system in accordance with the present invention has the optical density measurement means for measuring the optical density of the film, which has been thermally developed by the roll film heating system, immediately after the exposure of the roll film, so that the image can be monitored simultaneously with the thermal development and consequently the storage conditions of the unexposed film can be detected. In response to the results of this monitoring, it is confirmed that an image has been actually photographed, so that the rotary type microphotography camera system in accordance with the present invention is very effective in a system for photographing checks or the like.

In the rotary type microphotography camera system in accordance with the present invention, the roll film heating system is not disposed below the system for storing and unrolling an unexposed film, so that the system for stroing and unrolling the unexposed roll film is not unnecessarily heated. As a result, the camera system can be made compact in size and a length of wasted film can be shortened. In this case, the thermal shielding effect can be further enhanced by thermally separating the heating system from the film storage and unrolling system by a partition. In response to the detection of a temperature of a film in the film storage and unrolling system, the light source and the heating system can be deenergized to prevent the increase of the film temperature, so that the conditions for storage of an unexposed film can be improved.

In addition, sublimate produced in the step of thermal development can be removed by a circulation fan with a filter, so that no sublimate adheres to the optical density detection means and consequently the optical density can be checked for a long period of time in a stable manner.

Furthermore, in the rotary type microphotography camera system in accordance with the present invention, non-uniform illumination is utilized in such a way that the illumination in the original peripheral portion is higher than that in the original center portion, so that a lower sensitivity of a dry silver salt film compared with that of a wet type silver salt film can be compensated. As a result, a high photographic speed of the rotary type microphotography camera can be attained in a simple manner without deteriorating a quality of micro image photographed by the rotary type microphotography camera and without adversely affecting the safety of the original.

We claim:

1. A rotary type microphotography camera system, comprising:
  (a) a storage means for storing an unexposed roll film;
  (b) an unwinding means for unwinding said unexposed roll film from said storage means;
  (c) a light source for emitting light for illuminating an original to be exposed;
  (d) an optical means for illuminating said original by the light emitted from said light source under a condition that the travel of said original is synchronized with the unwinding of said unexposed film and for imaging the output light from said original on the surface of said unexposed roll film at a reduced size;

(e) a heating means for heating said roll film thus exposed by said optical means to thermally develop said roll film;

(f) a monitor means for measuring, immediately after the thermal development, the optical density of said roll film thermally developed by said heating means to monitor the storage conditions of said unexposed film substantially simultaneously with the exposure and the thermal development; and (g) a discharging means for discharging said thermally developed roll film.

2. A rotary type microphotography camera system as claimed in claim 1, wherein said monitor means comprises;
means for setting at least one of set values of a minimum optical density corresponding to a fog density of said thermally developed film and a maximum optical density corresponding to an image portion of said thermally developed film; and
means for comparing the measured optical density with the set value of said maximum optical density.

3. A rotary type microphotography camera system as claimed in claim 2, futher comprising:
means for counting the number of times that the measured optical density exceeds said set value of said maximum optical density as the number of frames, and
means for generating warning when a count value of said frames does not coincide with the number of originals which have passed through said optical system of said rotary type microphotography camera system.

4. A rotary type microphotography camera system as claimed in claim 2, further comprising:
means for comparing said measured optical density with said set value of said minimum optical density so that when the measured optical density is lower than said set value of said minimum optical density, it is judged that the unexposed film storage conditions are satisfactied; and
means for generating warning when said decision means recognizes that there exists no portion where the measured optical density is lower than said set value of said minimum optical density.

5. A rotary type microphotography camera system as claimed in claim 2, wherein said set value of said maximum optical density is in the range of 0.6–1.3, and said set value of said minimum optical density is in the range of 0.2–0.7 and a storage condition of said unexposed roll film is monitored, under a condition that said set value of said minimum optical density does not exceed said maximum optical density.

6. A rotary type microphotography camera system comprising:
(a) a storage means for storing an unexposed roll film;
(b) a unwinding means for unwinding said unexposed roll film from said storage means;
(c) a light source for emitting light for illuminating an original to be exposed;
(d) an optical means for illuminating said original by the light emitted from said light source under a condition that the travel of said original is synchronized with the unwinding of said unexposed film and for imaging the output light from said original on the surface of said unexposed roll film at a reduced size;

(e) a heating means for heating said roll film thus exposed by said optical means to thermally develop said roll film; and (f) a discharging means for discharging the thermally developed roll film; said heating means being not disposed beneath said storage means.

7. A rotary type microphotography camera system as claimed in claim 6, further comprising:
a partition wall for separating said optical means and/or said heating means from said storage means.

8. A rotary type microphotography camera system as claimed in claim 7, wherein said partition wall has a slit required for unrolling said unexposed roll film from said storage means and said partition wall is substantially in the form of a completely enclosed structure except said slit.

9. A rotary type microphotography camera system as claimed in claim 7, wherein at least 90% or more of an area of said partition wall is made of an organic synthetic macromolecular material having a thermal conductivity of $3 \times 10^{-3}$ cal/sec/cm$^2$/°C./cm or less or a reinforced organic synthetic macromolecular material containing inorganic filler in addition to said organic synthetic macromolecular material and said partition wall has a thickness of at least 0.5 mm or more in average.

10. A rotary type microphotography camera system as claimed in any one of claims 7–9, wherein said storage means is maintained at a positive pressure of at least 0.1 mm H$_2$O or more relative to the pressure in said optical means during the operation of said camera.

11. A rotary type microphotography camera system as claimed in any one of claims 7–9, wherein an amount of light invading into said storage means defined by said partition wall is limited to 5 lux or less at the most except the case that the roll film is loaded into or removed from said camera.

12. A rotary type microphotography camera system as claimed in claim 10, wherein said storage means has a duct for introducing air from the outside of said rotary type microphotography camera system into said storage means to cool said unexposed roll film, and said duct is so structured that the light emitted from said light source or exterior light is prevented from entering said storage means.

13. A rotary type microphotography camera system as claimed in any one of claims 7–9, further comprising:
means for measuring a temperature of said storage means;
means for judging whether or not the measured temperature exceeds a predetermined temperature; and
means for deenergizing said light source and/or said heating means when said measured temperature exceeds said predetermined temperature.

14. A rotary type microphotography camera system as claimed in claim 13, wherein said predetermined temperature is set at a temperature higher by 5°–15° C. than room temperature.

15. A rotary type microphotography camera system as claimed in claim 7 or 8, further comprising:
means for measuring, immediately after the thermal development, the optical density of said roll film thermally developed by said heating means to monitor the storage conditions of said unexposed film substantially simultaneously with the exposure and the thermal development.

16. A rotary type microphotography camera system as claimed in claim 1, wherein said heating means includes means for removing sublimate produced during the thermal development.

17. A rotary type microphotography camera system as claimed in claim 16, wherein said removing means has a circulating fan with a filter for trapping said sublimate.

18. A rotary type microphotography camera system in which a dry silver salt roll film is heated, comprising:
  a travel means for travelling said roll film;
  a tension means for applying a tension to said roll film so as to produce a resisting force against the travelling of said roll film;
  a cylindrical roller heater made of a material having a high thermal conductivity;
  a rotating means for rotating said roller heater;
  a holding means for holding said roller heater in such a way that the rotating tangential direction of said roller heater is maintained in coincidence with the direction of the travel of said roll film, and a heating control means for heating said roller heater at a predetermined temperature;
  said tension means being disposed behind said film travel means in the direction of the travel of said roll film, said roll heater being interposed between said film travel means and said tension means in such a way that the surface of the base of said roll film is wound around and made into contact with said roll heater over a predetermined angle; and
  said tension means being so adjusted that the tension applied to said roll film between said film travel means and said tension means is 5–250 g/mm² per unit cross sectional area of said roll film, whereby the roll film is made into contact with said roll heater and is heated.

19. A rotary type microphotography camera system as claimed in claim 18, further comprising:
  cooling means which is arranged between said film travel means and said roll heater to cool said roll film, which is heated at a temperature equal to or higher than a softening point, down below said softening point.

20. A rotary type microphotography camera system as claimed in claim 18 or 19, wherein a speed ration between the speed of the outer diameter of said roller heater in the rotating tangential direction and the travel speed of said roll film is selected to be within a range between 1 and 0.95, when said travel speed of said roll film is 1.

21. A rotary type microphotography camera system, comprising:
  (a) a storage means for storing an unexposed roll film;
  (b) an unwinding means for unwinding said unexposed roll film from said storage means;
  (c) a light source for emitting light for illuminating an original to be exposed;
  (d) an optical means for illuminating said original by the light emitted from said light source under the condition that the travel of said original is synchronized with the unwinding of said unexposed film and for imaging the output light from said original on the surface of said unexposed roll film at a reduced size;
  (e) a heating means for heating said roll film thus exposed by said optical means to thermally develop said roll film; and
  (f) a discharging means for discharging said thermally developed roll film; said light source emitting the illuminating light in such a way that a peripheral portion which is spaced apart from a center portion where the optical axis of said optical means is substantially perpendicular to said original and which is exposed simultaneously with said center portion is illuminated at an illumination higher than that illuminating said center portion where said optical axis of said optical means is substantially perpendicular to said original.

22. A rotary type microphotography camera system as claimed in claim 21, wherein said optical means has a photographic lens and when an angle formed between the line connecting said peripheral portion with the center of said photographic lens and the optical axis of said photographic lens defines an incident angle, said light source illuminates the original in such a way that the illumination on said peripheral portion is not lower than at least the reciprocal number of the fourth power of the cosine of said incident angle relative to the illumination on said center portion.

23. A rotary type microphotography camera system as claimed in claim 21 or 22, wherein said optical means has a substantially rectangular slit and the output light from said original is incident to said unexposed roll film through said slit.

24. A rotary type microphotography camera system comprising;
  (a) a storage means for storing an unexposed roll film;
  (b) an unwinding means for unwinding said unexposed roll film from said storage means;
  (c) a first heating means for heating the unrolled unexposed film to activate said roll film;
  (d) a light source for emitting light for illuminating an original to be exposed;
  (e) an optical means for illuminating said original by the light emitted from said light source under a condition that the travel of said original is synchronized with the unwinding of said unexposed film and for imaging the output light from said original on the surface of said unexposed roll film at a reduced size;
  (f) a second heating means for heating the roll film exposed by said optical means to thermally develop the exposed film;
  (g) a monitor means for measuring, immediately after the thermal development, the optical density of said roll film thermally developed by said heating means to monitor the storage conditions of said unexposed film substantially simultaneously with the exposure and the thermal development; and
  (h) a discharging means for discharging said thermally developed roll film.

25. A rotary type microphotography camera system as claimed in claim 24, wherein said monitor means comprises;
  means for setting at least one of set values of a minimum optical density corresponding to a fog density of said thermally developed film and a maximum optical density corresponding to an image portion of said thermally developed film; and
  means for comparing the measured optical density with the set value of said maximum optical density.

26. A rotary type microphotography camera system as claimed in claim 25, further comprising:
  means for counting the number of times that the measured optical density exceeds said set value of said maximum optical density as the number of frames, and
means for generating warning when a count value of the frames does not coincide with the number of originals which have passed through said optical system of said rotary type microphotography camera system.

27. A rotary type microphotography camera system as claimed in claim 25, further comprising:
means for comparing said measured optical density with said set value of said minimum optical density so that when the measured optical density is lower than said set value of said minimum optical density, it is judged that the unexposed film storage conditions are satisfied; and
means for generating warning when said decision means recognizes that there exists no portion where the measured optical density is lower than said set value of said minimum optical density.

28. A rotary type microphotography camera system as claimed in claim 25, wherein said set value of said maximum optical density is in the range of 0.6–1.3, and said set value of said minimum optical density is in the range of 0.2–0.7 and a storage condition of said unexposed roll film is monitored, under a condition that said set value of said minimum optical density does not exceed said maximum optical density.

29. A rotary type microphotography camera system comprising:
(a) a storage means for storing an unexposed roll film;
(b) an unwinding means for unwinding said unexposed roll film from said storage means;
(c) a first heating means for heating the unrolled unexposed film to activate said roll film;
(d) a light source for emitting light for illuminating an original to be exposed;
(e) an optical means for illuminating said original by the light emitted from said light source under a condition that the travel of said original is synchronized with the unwinding of said unexposed film and for imaging the output light from said original on the surface of said unexposed roll film at a reduced size;
(f) a second heating means for heating the roll film exposed by said optical means to thermally develop the exposed film; and
(g) a discharging means for discharging said thermally developed roll film; said first and second heating means being not disposed below said storage means.

30. A rotary type microphotography camera system as claimed in claim 29, further comprising:
a patition wall for separating said first and second heating means and/or said optical means from said storage means.

31. A rotary type microphotography camera system as claimed in claim 30, wherein said partition wall has a slit required for unrolling said unexposed roll film from said storage means toward said first heating means and said partition wall is substantially in the form of a completely enclosed structure except said slit.

32. A rotary type microphotography camera system as claimed in claim 30, wherein at least 90% or more of an area of said partition wall is made of an organic synthetic macromolecular material having a thermal conductivity of $3 \times 10^{-3}$ cal/sec/cm$^2$/°C./cm or less or a reinforced organic synthetic macromolecular material containing inorganic filler in addition to said organic synthetic macromolecular material and said partition wall has a thickness of at least 0.5 mm or more in average.

33. A rotary type microphotography camera system as claimed in any one of claims 30–32, wherein said storage means is maintained at a positive pressure of at least 0.1 mm H$_2$O or more relative to the pressure in said first heating means and/or said optical means during the operation of said camera.

34. A rotary type microphotography camera system as claimed in any one of claims 30–32, wherein an amount of light invading into said storage means defined by said partition wall is limited to 5 lux or less at the most except the case that the roll film is loaded into or removed from said camera.

35. A rotary type microphotography camera system as claimed in claim 33, wherein said storage means has a duct for introducing the air from the outside of said rotary type microphotography camera system into said storage means to cool said unexposed roll film, and said duct is so structured that the light emitted from said light source or exterior light is prevented from entering said storage means.

36. A rotary type microphotography camera system as claimed in any one of claims 30–32, further comprising:
means for measuring a temperature of said storage means;
means for judging whether or not the measured temperature exceeds a predetermined temperature; and
means for deenergizing said light source and/or said first heating means when said measured temperature exceeds said predetermined temperature.

37. A rotary type microphotography camera system as claimed in claim 36, wherein said predetermined temperature is set at a temperature higher by 5°–15° C. than room temperature.

38. A rotary type microphotography camera system as claimed in claim 30 or 31, further comprising:
means for measuring, immediately after the thermal development, the optical density of said roll film thermally developed by said second heating means to monitor the storage conditions of said unexposed film substantially simultaneously with the exposure and the thermal development.

39. A rotary type microphotography camera system as claimed in claim 24, wherein said second heating means includes means for removing sublimate produced during the thermal development to protect said optical density measurment means.

40. A rotary type microphotography camera system as claimed in claim 39, wherein said removing means has a circulating fan with a filter for trapping said sublimate.

41. A rotary type microphotography camera system comprising:
(a) a storage means for storing an unexposed roll film;
(b) an unwinding means for unwinding said unexposed roll film from said storage means;
(c) a first heating means for heating the unrolled unexposed film to activate said roll film;
(d) a light source for emitting light for illuminating an original to be exposed;
(e) an optical means for illuminating said original by the light emitted from said light source under a condition that the travel of said original is synchronzied with the unwinding of said unexposed film and for imaging the output light from said original on the surface of said unexposed roll film at a reduced size;

(f) a second heating means for heating the roll film exposed by said optical means to thermally develop the exposed film;

(g) a discharging means for discharging said thermally developed roll film;

said light source emitting the illuminating light in such a way that a peripheral portion which is spaced apart from a center portion where the optical axis of said optical means is substantially perpendicular to said original and which is exposed simultaneously with said center portion is illuminated at an illumination higher than that illuminating said center portion where said optical axis of said optical means is substantially perpendicular to said original.

42. A rotary type microphotography camera system as claimed in claim 41, wherein said optical means has a photographic lens and where an angle formed between the line connecting said peripheral portion with the center of said photographic lens and the optical axis of said photographic lens defines an incident angle, said light source illuminates the original in such a way that the illumination on said peripheral portion is not lower than at least the reciprocal number of the fourth power of the cosine of said incident angle relative to the illumination on said center portion.

43. A rotary type microphotography camera system as claimed in claim 41 or 42, wherein said optical means has a substantially rectangular slit and the output light from said original is incident to said unexposed roll film through said slit.

44. A rotary type microphotography camera system as claimed in claim 11, wherein said storage means has a duct for introducing air from the outside of said rotary type microphotography camera system into said storage means to cool said unexposed roll film, and said duct is so structured that the light emitted from said light source or exterior light is prevented from entering said storage means.

45. A rotary type microphotography camera system as claimed in claim 15, wherein said heating means includes means for removing sublimate produced during the thermal development.

46. A rotary type microphotography camera system as claimed in claim 34, wherein said storage means has a duct for introducing the air from the outside of said rotary type microphotography camera system into said storage means to cool said unexposed roll film, and said duct is so structured that the light emitted from said light source or exterior light is prevented from entering said storage means.

47. A rotary type microphotography camera system as claimed in claim 38, wherein said second heating means includes means for removing sublimate produced during the thermal development to protect said optical density measurement means.

* * * * *